US010726014B2

(12) United States Patent
Jindal et al.

(10) Patent No.: US 10,726,014 B2
(45) Date of Patent: Jul. 28, 2020

(54) SELECTION OF SUBEXPRESSIONS TO MATERIALIZE FOR DATACENTER SCALE

(71) Applicant: Microsoft Technology Licensing, LLC, Redmond, WA (US)

(72) Inventors: Alekh Jindal, Kirkland, WA (US); Konstantinos Karanasos, San Francisco, CA (US); Hiren Shantilal Patel, Bothell, WA (US); Sriram S Rao, Saratoga, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 15/884,282

(22) Filed: Jan. 30, 2018

(65) Prior Publication Data

US 2019/0236189 A1 Aug. 1, 2019

(51) Int. Cl.
*G06F 16/00* (2019.01)
*G06F 16/2453* (2019.01)

(52) U.S. Cl.
CPC .... *G06F 16/24545* (2019.01); *G06F 16/2454* (2019.01); *G06F 16/24535* (2019.01); *G06F 16/24539* (2019.01)

(58) Field of Classification Search
CPC ......... G06F 16/24539; G06F 16/24535; G06F 16/2454; G06F 16/24545; G06F 16/24542; G06F 16/2453; G06F 16/2282; G06F 16/2455; G06F 16/24552; G06F 16/24557; G06F 16/24561
See application file for complete search history.

(56) References Cited

U.S. PATENT DOCUMENTS

| 6,026,390 | A | * | 2/2000 | Ross | G06F 16/2393 |
| 6,061,676 | A | * | 5/2000 | Srivastava | G06F 16/24537 |
| | | | | | 707/694 |
| 6,341,281 | B1 | * | 1/2002 | MacNicol | G06F 16/24539 |
| 9,183,254 | B1 | * | 11/2015 | Cole | G06F 16/2453 |
| 9,280,583 | B2 | * | 3/2016 | Duan | G06F 16/24545 |
| 2003/0093415 | A1 | * | 5/2003 | Larson | G06F 16/24539 |
| 2007/0219951 | A1 | * | 9/2007 | Ahmed | G06F 16/24544 |
| 2007/0250473 | A1 | * | 10/2007 | Larson | G06F 16/24539 |

(Continued)

OTHER PUBLICATIONS

Kathuria, et al., "Efficient and Provable Multi-Query Optimization", In Proceedings of the 36th ACM SIGMOD-SIGACT-SIGAI Symposium on Principles of Database Systems, May 14, 2017, 15 Pages.

(Continued)

*Primary Examiner* — Merilyn P Nguyen
(74) *Attorney, Agent, or Firm* — Rainier Patents, P.S.

(57) ABSTRACT

Described herein is a system and method for selecting subexpressions to be materialized. For a predefined storage budget, subexpressions of a set of candidate subexpressions to be materialized to minimize query evaluation cost are selected based upon a calculated utility of the set of candidate subexpressions, interactions of the candidate subexpressions, and, a cost of evaluating the candidate subexpressions. Based upon the subexpressions selected to be materialized, subexpression(s) of the set of candidate subexpressions to use when evaluating particular queries of the set of queries to minimize query evaluation cost are determined.

20 Claims, 26 Drawing Sheets

(56) References Cited

U.S. PATENT DOCUMENTS

2008/0010240 A1* 1/2008 Zait .................. G06F 16/24542
2017/0228425 A1* 8/2017 Kandula ............. G06F 16/2246

OTHER PUBLICATIONS

Diao, et al., "Efficient and scalable filtering of XML documents", In Proceedings of 18th International Conference on Data Engineering, Feb. 26, 2002, 2 Pages.
"Gurobi Optimizer Reference Manual (Version 5.6)", Retrieved at: <<http://www.gurobi.com/documentation/5.6/refman.pdf>>, Dec. 2013, 531 Pages.
Chen, et al., "NiagaraCQ: A Scalable Continuous Query System for Internet Databases", In Proceedings of the ACM SIGMOD International Conference on Management of Data, vol. 29, Issue 2, May 16, 2000, pp. 379-390.
Chandrasekaran, et al., "TelegraphCQ: Continuous Dataflow Processing for an Uncertain World", In Proceedings of the CIDR Conference, Jan. 5, 2003, 12 Pages.
Bayir, et al., "Genetic Algorithm for the Multiple-Query Optimization Problem", In Proceedings of IEEE Transactions on Systems, Man, and Cybernetics, Part C (Applications and Reviews), vol. 37, Issue: 1, Dec. 19, 2006, pp. 147-153.
"Amazon Athena", Retrieved From <<https://aws.amazon.com/athena/>>, Retrieved on: Jan. 3, 2018, 7 Pages.
Theodoratos, et al., "Data warehouse configuration", In Proceedings of the 23rd VLDB Conference, vol. 97, Aug. 25, 1997, pp. 126-135.
"Microsoft Solver Foundation 3.1", Retrieved From <<https://msdn.microsoft.com/en-us/library/ff524509(v=vs.93).aspx>>, Retrieved on: Jan. 3, 2018, 3 Pages.
"Powered by Apache Hadoop", Retrieved From <<http://wiki.apache.org/hadoop/PoweredBy>>, Retrieved on: Jan. 3, 2018, 22 Pages.
"Presto | Distributed SQL Query Engine for Big Data", Retrieved From <<https://prestodb.io/>>, Retrieved on: Jan. 3, 2018, 2 Pages.
"Turi", Retrieved From <<https://turi.com/>>, Retrieved on: Jan. 3, 2018, 1 Page.
"Welcome to Apache Giraph!", Retrieved From <<http://giraph.apache.org/>>, Oct. 24, 2016, 1 Page.
Agrawal, et al., "Automated selection of materialized views and indexes in SQL databases", In Proceedings of the 26th International Conference on Very Large Data Bases, Sep. 10, 2000, pp 496-505.
Bruno, et al., "Recurring job optimization in SCOPE", In Proceedings of the ACM SIGMOD International Conference on Management of Data, May 20, 2012, pp. 805-806.
Camacho-Rodriguez, et al., "Reuse-based Optimization for Pig Latin", In Proceedings of the 25th ACM International on Conference on Information and Knowledge Management, Oct. 24, 2016, pp. 2215-2220.
Elghandour, et al., "ReStore: Reusing results of mapreduce jobs", In Proceedings of the VLDB Endowment, vol. 5, Issue 6, Feb. 2012, pp. 586-597.
Fan, et al., "The case against specialized graph analytics engines", In Proceedings of 7th Biennial Conference on Innovative Data Systems Research, Jan. 4, 2015, pp. 1-10.
Ferguson, et al., "Jockey: Guaranteed job latency in data parallel clusters", In Proceedings of the 7th ACM european conference on Computer Systems, Apr. 10, 2012, pp. 99-112.
Giannikis, et al., "Shared workload optimization", In Proceedings of the VLDB Endowment, vol. 7, Issue 6, Feb. 2014, pp. 429-440.
Goasdoue, et al., "View selection in semantic web databases", In Proceedings of the VLDB Endowment, vol. 5, Issue 2, Oct. 2011, pp. 97-108.
Gunda, et al., "Nectar: Automatic management of data and computation in datacenters", In Proceedings of the 9th USENIX conference on Operating systems design and implementation, Oct. 4, 2010, 14 Pages.
Gupta, Himanshu, "Selection of Views to Materialize in a Data Warehouse", In Proceedings of 6th International Conference on Database Theory, Jan. 8, 1997, 15 Pages.

Gupta, et al., "Selection of views to materialize in a data warehouse", In Journal of IEEE Transactions on Knowledge and Data Engineering, vol. 17, Issue 1, Jan. 2005, pp. 24-43.
Halevy, Alon Y., "Answering queries using views: A survey", In International Journal on Very Large Data Bases, vol. 10, Issue 4, Dec. 2001, pp. 270-294.
Harinarayan, et al., "Implementing data cubes efficiently", In Proceedings of the ACM SIGMOD international connference on Management of data, Jun. 4, 1996, pp. 205-216.
Ivanova, et al., "An architecture for recycling intermediates in a column-store", In Proceedings of the ACM SIGMOD International Conference on Management of data, Jun. 29, 2009, pp. 309-320.
Jindal, et al., "Graph Analytics using Vertica Relational Database", In Proceedings of the IEEE International Conference on Big Data, Nov. 1, 2015, pp. 1-13.
Jindal, et al., "GraphiQL: A Graph Intuitive Query Language for Relational Databases", In Proceedings of IEEE International Conference on Big Data, Oct. 27, 2014, 11 Pages.
Jindal, et al., "Vertexica: Your Relational Friend for Graph Analytics", In Proceedings of the VLDB Endowment, vol. 7, Issue 13, Aug. 2014, pp. 1669-1672.
Jyothi, et al., "Morpheus: Towards automated SLOs for enterprise clusters", In Proceedings of the 12th USENIX conference on Operating Systems Design and Implementation, Nov. 2, 2016, 18 Pages.
Kunjir, et al., "ROBUS: Fair Cache Allocation for Data-parallel Workloads", In Proceedings of the ACM International Conference on Management of Data, May 14, 2017, pp. 219-234.
Lefevre, et al., "Opportunistic physical design for big data analytics", In Proceedings of the ACM SIGMOD International Conference on Management of Data, Jun. 22, 2014, pp. 851-862.
Liu, et al., "Kodiak: Leveraging materialized views for very low-latency analytics over high-dimensional web-scale data", In Proceedings of the VLDB Endowment, vol. 9, Issue 13, Sep. 2016, pp. 1269-1280.
Makreshanski, et al., "Mqjoin: Efficient shared execution of main-memory joins", In Proceedings of the VLDB Endowment, vol. 9, Issue 6, Jan. 2016, pp. 480-491.
Malewicz, et al., "Pregel: A System for Large-scale Graph Processing", In Proceedings of the ACM SIGMOD International Conference on Management of data, Jun. 6, 2010, pp. 135-145.
Mami, et al., "A survey of view selection methods", In Newsletter of ACM SIGMOD Record, vol. 41, Issue 1, Mar. 2012, pp. 20-29.
Martella, et al., "Spinner: Scalable Graph Partitioning in the Cloud", In Proceedings of IEEE 33rd International Conference on Data Engineering, Apr. 19, 2017, pp. 1-15.
Nagel, et al., "Recycling in pipelined query evaluation", In Proceedings of IEEE 29th International Conference on Data Engineering, Apr. 8, 2013, 12 Pages.
Nykiel, et al., "MRShare: Sharing across multiple queries in MapReduce", In Proceedings of the VLDB Endowment, vol. 3, Issue 1-2, Sep. 2010, pp. 494-505.
Perez, et al., "History-aware query optimization with materialized intermediate views", In Proceedings of IEEE 30th International Conference on Data Engineering, Mar. 31, 2014, pp. 520-531.
Qiao, et al., "Main-memory scan sharing for multi-core CPUs", In Proceedings of the VLDB Endowment, vol. 1, Issue 1, Aug. 23, 2008, pp. 610-621.
Ramakrishnan, et al., "Azure data lake store: A hyperscale distributed file service for big data analytics", In Proceedings of the ACM International Conference on Management of Data, May 14, 2017, pp. 51-63.
Roy, et al., "Efficient and extensible algorithms for multi query optimization", In Proceedings of the ACM SIGMOD International conference on Management of data, May 15, 2000, pp. 249-260.
Sellis, Timos K., "Multiple-query optimization", In Journal of ACM Transactions on Database Systems, vol. 13, Issue 1, Mar. 1988, pp. 23-52.
Silva, et al., "Exploiting common subexpressions for cloud query processing", In Proceedings of the IEEE 28th International Conference on Data Engineering, Apr. 1, 2012, 12 Pages.

(56) References Cited

OTHER PUBLICATIONS

Thusoo, et al., "Hive: a warehousing solution over a map-reduce framework", In Proceedings of the VLDB Endowment, vol. 2, Issue 2, Aug. 24, 2009, pp. 1626-1629.
Verma, et al., "Large-scale cluster management at Google with Borg", In Proceedings of the European Conference on Computer Systems, Apr. 21, 2015, 18 Pages.
Wang, et al., "CoScan: Cooperative Scan Sharing in the Cloud", In Proceedings of the 2nd ACM Symposium on Cloud Computing, Oct. 27, 2011, 12 Pages.
Wang, et al., "Multi-query optimization in mapReduce framework", In Proceedings of the VLDB Endowment, vol. 7, Issue 3, Nov. 2013, pp. 145-156.
Yu, et al., "DryadLINQ: A system for general-purpose distributed data-parallel computing using a high-level language", In Proceedings of the 8th USENIX conference on Operating systems design and implementation, Dec. 8, 2008, pp. 1-14.
Zhou, et al., "Efficient exploitation of similar subexpressions for query processing", In Proceedings of the ACM SIGMOD international conference on Management of data, Jun. 12, 2007, pp. 533-544.
Zhou et al., "SCOPE: parallel databases meet MapReduce", In International Journal on Very Large Data Bases, vol. 21, Issue 5, Oct. 2012, pp. 611-636.
Zukowski, et al., "Cooperative scans: Dynamic bandwidth sharing in a DBMS", In Proceedings of the 33rd international conference on Very large data bases, Sep. 23, 2007, pp. 723-734.
Hashemi, Mazdak, "Infrastructure: The Infrastructure Behind Twitter: Scale", Jan. 19, 2017, retrieved from: <<https://blog.twitter.com/engineering/en_us/topics/infrastructure/2017/the-infrastructure-behind-twitter-scale.html>> on Jan. 30, 2018, 23 pages.
Jindal, Alekh, et al. "Selecting Subexpressions to Materialize at Datacenter Scale", retrieved from: https://www.microsoft.com/en-us/research/uploads/prod/2018/03/bigsubs-vldb2018.pdf on May 31, 2018, 13 pages.

\* cited by examiner

2. Probabilistically flip subexpression labels

3. Label edge vertices via local per-query ILP

NON-INTERACTING SUBEXPRESSION SETS (a) Number of States.

(b) Algorithm runtime.

(c) Total utility.

(d) Relaxed optimal.

(b) Flipping frequency=5

SELECTION OF SUBEXPRESSIONS TO MATERIALIZE FOR DATACENTER SCALE

BACKGROUND

Shared analytics clusters have become the de facto way for large organizations to analyze and gain insights over their data. Often, a cluster is comprised of tens of thousands of machines, storing exabytes of data, and supporting thousands of users, collectively running hundreds of thousands of batch jobs daily.

With shared analytics clusters, significant overlaps can be observed in the computations performed by the submitted jobs. Naively computing the same job subexpressions multiple times wastes cluster resources, which has a detrimental effect on the cluster's operational costs.

SUMMARY

Described herein is a system for selecting subexpressions to be materialized, comprising: a computer comprising a processor and a memory having computer-executable instructions stored thereupon which, when executed by the processor, cause the computing device to: for a predefined storage budget, subexpressions of a set of candidate subexpressions to be materialized to minimize query evaluation cost are selected based upon a calculated utility of the set of candidate subexpressions, interactions of the candidate subexpressions, and, a cost of evaluating the candidate subexpressions. Based upon the subexpressions selected to be materialized, one or more subexpressions of the set of candidate subexpressions to use when evaluating particular queries of the set of queries to minimize query evaluation cost are determined.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
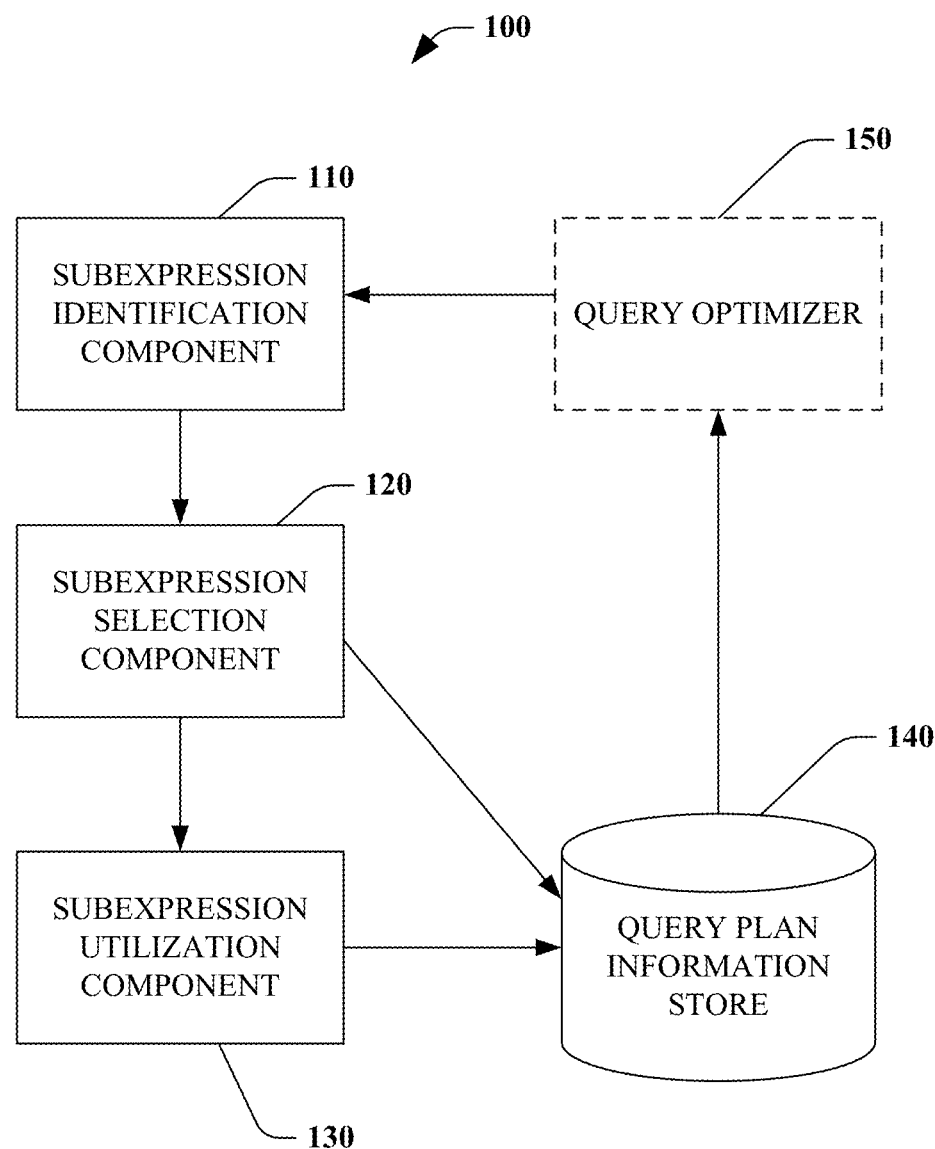
FIG. 1 is a functional block diagram that illustrates a system for selecting subexpressions to be materialized for a datacenter.

Various technologies pertaining to selecting subexpressions to be materialized are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding selecting subexpressions to be materialized. What follows are one or more exemplary systems and methods.

Aspects of the subject disclosure pertain to the technical problem of selecting subexpressions to be materialized (e.g., for a datacenter). The technical features associated with addressing this problem involve identifying a set of candidate subexpressions of a set of queries. For a predefined storage budget, subexpressions of the set of candidate subexpressions to be materialized to minimize query evaluation cost are selected based upon utility of the set of candidate subexpressions, interactions of the candidate subexpressions, and, cost of evaluating the candidate subexpressions. Based upon the subexpressions selected to be materialized, subexpressions of the set of candidate subexpressions to use when evaluating a particular query of the set of queries to minimize query evaluation cost are determined. Accordingly, aspects of these technical features exhibit technical effects of more efficiently and effectively providing a response to a query of the datacenter, for example, reducing computing resource(s) and/or query response time.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Referring to FIG. 1, a system for selecting subexpressions to be materialized for a datacenter 100 is illustrated. By selecting common parts of queries (e.g., subexpressions), the system 100 can significantly reduce query evaluation response time and/or cost. The system 100 includes a subexpression identification component 110, a subexpression selection component 120 and a subexpression utilization component 130.

The subexpression identification component 110 can identify a set of candidate subexpressions from the set of subexpressions and the subexpression selection component 120 can select which subexpressions to materialize. Based on the selected subexpressions to materialize, the subexpression utilization component 130 can determine subexpressions to use for evaluating particular queries.

In some embodiments, information regarding the subexpressions selected to be materialized and the determined subexpressions to use for evaluating particular queries can be stored in a query plan information store 140 for use (e.g., by a query optimizer 150) when responding to a query. Results of subexpression evaluations can then be stored for use in responding to the query and subsequent query(ies).

In some embodiments, information regarding the subexpressions determined to be materialized can be used to evaluate the subexpressions against a datacenter. Results of evaluation can be stored for use in responding to subsequent query(ies) (e.g., by a query optimizer 150).

In some embodiments, the set of candidate subexpressions comprises all subexpressions within a particular set of queries. In some embodiments, in order to pre-filter subexpressions which would likely not significantly impact query evaluation cost, the set of candidate subexpressions comprises subexpressions which meet threshold requirement(s) within a particular set of queries. For example, the threshold requirement(s) can be associated with an expected frequency of use based upon stored historical data (e.g., subexpression(s) which are not frequently utilized) and/or associated with lack of commonality (e.g., subexpression(s) which are utilized by an insignificant quantity of queries).

Figures 2A, 2B, 2C:
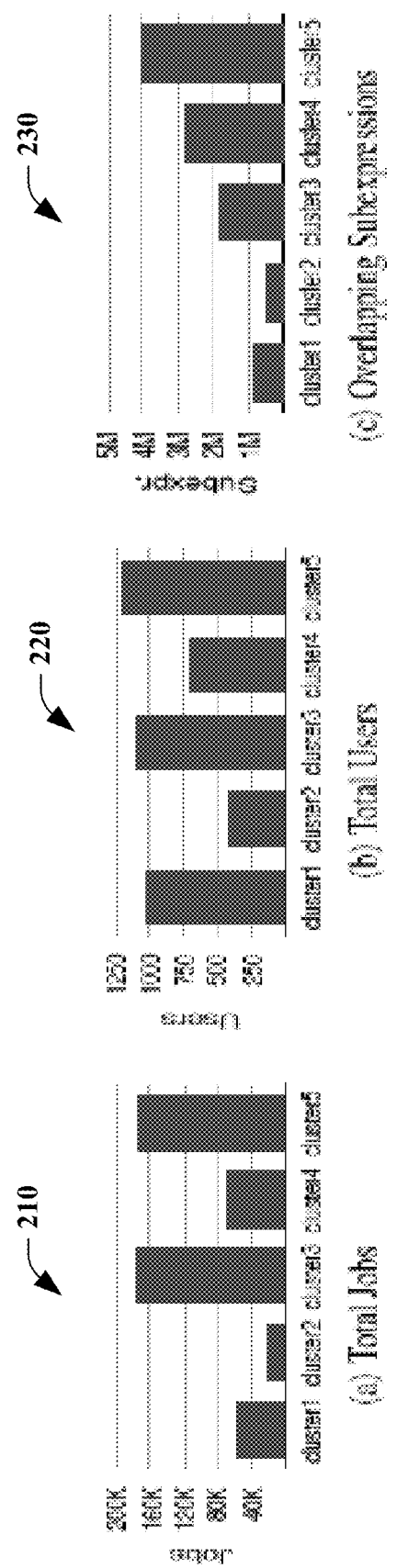
FIGS. 2A-2C are graphs illustrating an exemplary daily workload summary for analytics clusters.

Turning briefly to FIG. 2, an exemplary daily workload summary for analytics clusters is illustrated. FIGS. 2(a) and 2(b) are graphs 210, 220 that summarize the number of jobs and users, respectively, on a typical day at a few analytics clusters. These clusters run business critical workloads and are expensive to run and operate. Therefore, operators and users alike are consistently exploring opportunities to speed-up job performance.

The shared nature of these clusters and a lack of coordination between users that often belong to different parts of the organization lead to unnecessary overlaps across computations performed by the users, which in turn cost the organizations/companies millions of dollars. In some embodiments, an analysis of cluster workloads reveals that over 45% of the daily jobs submitted by approximately 65% of the users have commonalities, resulting in millions of subexpression overlaps, as reported in graph 230 of FIG. 2(c). In some embodiments, the system 100 can identify and reuse such subexpressions which can lead to saving up to 40% machine-hours in clusters.

Global optimization decisions can further be motivated by the observation that business-critical jobs in analytics clusters are typically recurrent. Instances of the same job are issued periodically over new batches of data, e.g., hourly, daily, or weekly. In some embodiments, over 60% of the jobs in clusters are recurrent, with the majority of the jobs being submitted daily.

The system 100 focuses on subexpression selection, a specialization of a view selection problem that considers subtrees of the queries' logical plans as view candidates. In some embodiments, a workload comprising a set of queries (e.g., tens of thousands of queries) is considered with the most promising subexpressions to materialize being selected in order to improve evaluation of subsequent queries.

In some embodiments, subexpression selection is mapped to a bipartite graph labeling problem. The graph's vertices represent the queries and the candidate subexpressions, while the edges encode whether a subexpression can be useful to a query. Then the graph label is split into two sub-problems: (i) labeling the subexpression vertices, which dictates the subexpressions that will be materialized, and (ii) labeling the edges, which determines the materialized subexpressions that will be used to evaluate each query. In some embodiment, to scale to the workload sizes, a vertex-centric graph processing model is utilized that iteratively performs the labeling steps in parallel until convergence is achieved or a predefined number of iterations has been performed. For the vertex labeling portion, a probabilistic approach is employed, while for the edge labeling portion, local per-query integer linear programs (ILPs) are solved.

Problem Formulation

Figure 3:
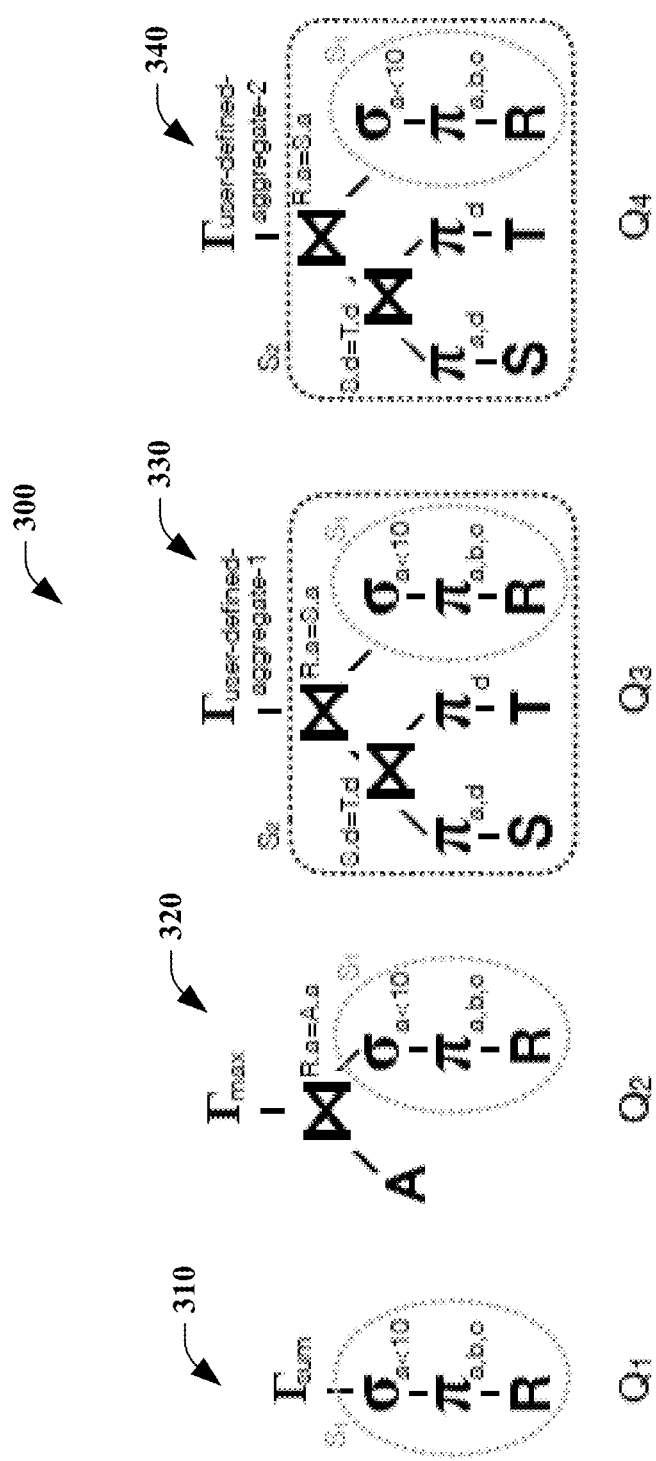
FIG. 3 is a diagram illustrating four exemplary queries.

For purposes of explanation, turning to FIG. 3, a diagram 300 of four exemplary queries 310, 320, 330, 340 is illustrated. The diagram 300 includes four queries $Q_1$, $Q_2$, $Q_3$ and $Q_4$ and two candidate subexpressions $S_1$ and $S_2$. In the diagram, while $S_1$ appears in more queries than $S_2$, $S_1$ may be less useful as $S_1$ captures a less complicated computation than $S_2$. On the other hand, $S_2$ may be much larger than $S_1$ in terms of byte size, i.e., it will consume more storage budget. Finally, if $S_2$ is materialized, then $S_1$ becomes redundant for evaluating $Q_3$ and $Q_4$, as it is a subtree of $S_2$. $S_1$ may still be materialized and used for evaluating $Q_1$, $Q_2$.

With this motivating example, a problem statement useful for purposes of explanation is provided.

As mentioned above, workloads with recurring queries of fixed periodicity (mostly daily or weekly) with computation overlap across queries are considered. Moreover, an append-only storage system with queries operating on new batches of data arriving between each recurring instance is considered. In some embodiments, given that a big part of the workload is changing slowly, a goal is to periodically perform an offline selection of subexpressions to materialize. Then, each time such a subexpression references new data, the subexpression gets materialized using fresh data (e.g., re-materialized) and is then used across all queries that use the same subexpression over the same time period.

Problem Statement

Let $Q = \{q_1, q_2, \ldots, q_n\}$ be a set of queries over a set of data sources D, and $C_D(q_i)$ be the cost of evaluating query $q_i$ over D. Let $S = \{s_1, s_2, \ldots, s_m\}$ be a set of materialized (e.g., stored) subexpressions and $C_S(q_i)$ be the cost of evaluating $q_i$ over D∪S. The cost $C_S(Q)$ of evaluating the whole query set over D∪S is equal to the sum of evaluation costs of every query in $Q$: $C_S(Q) = \Sigma_{i=1}^{n} C_s(q_i)$. Typically, each query $q_i$ is associated with a weight $w_i$ that denotes its relative importance to the rest of the queries, such as the frequency with which it gets executed. In some embodiments, for purposes of explanation and without loss of generality, $w_i = 1$ is assumed for all queries.

Subexpression Selection

For subexpression selection, the goal is to select the set S of subexpressions from the set $\mathcal{S}$ of candidate subexpressions for $Q$ that minimizes the cost of evaluating $Q$ under a constraint set $\mathcal{C}$:

$$\arg\min_{S \subseteq \mathcal{S}} C_S(Q), \text{ under } C \qquad \text{Eq. (1)}$$

Candidate subexpressions can be defined as follows: let q be a query and t be a tree corresponding to a logical plan of q. Any subtree t' of t is a candidate subexpression for q.

Candidate Subexpression Enumeration

In some embodiments, based on this definition of candidate subexpressions, the subexpression identification component 110 can identify a set of candidate subexpressions S out of a set of all possible subexpressions of the queries in $Q$. A complete subexpression enumeration strategy considers all possible subexpressions in $Q$.

In some embodiments, for each query, the logical plan that is output by the optimizer is used and enumeration is restricted to its subexpressions. Although this choice can compromise optimality, it was made purposefully to: (i) be less intrusive to the optimizer (less changes in this complex system component mean easier adoption of the approach both in the production setting and by external systems); (ii) reduce the search space, given the workload sizes; (iii) reuse existing plan signatures to efficiently decide subexpression equivalence; and/or (iv) use precise statistics from previous query runs instead of solely relying on the optimizer's estimates.

In some embodiments, to reduce the number of candidates, the subexpression identification component 110 considers only a subset of the candidate subexpressions. In some embodiments, in order to avoid enumerating equivalent subexpressions multiple times, for each query, the subexpression identification component 110 uses a logical plan that is output by a query optimizer 140. The subexpression identification component 110 then enumerates subexpressions provided in the logical plan. In some embodiment, subexpressions can be identified using plan signatures to efficiently decide equivalence between subexpressions across queries.

Utility of Subexpressions

The subexpression selection component 120 can select which subexpressions of the set of candidate subexpressions to be materialized (e.g., to minimize query valuation cost and/or time). In some embodiments, this selection can be based upon a calculated utility of at least some of the candidate subexpressions.

The utility of a subexpression s over a query q is the reduction in the evaluation cost of q by using s. In some embodiments, this is equivalent to the difference between the cost $C_D(s_j)$ of evaluating $s_j$ over the base data and the cost $C_{acc}(s_j)$ of accessing $s_j$ after it has been materialized. The subexpression selection component 120 may employ the assumption that $C_{acc}(s_j)$ is equal to scanning $s_j$. In some embodiments, the subexpression selection component 120 employs more sophisticated cost models that take into account pipelining of operators and/or physical attributes (e.g., ordering, partitioning).

The utility of a subexpression can be defined as follows: Let $q_i$ be a query and $s_j$ one of its candidate subexpressions, the utility $u_{ij}$ of $s_j$ for $q_i$ can be defined as:

$$u_{ij} = C_D(s_j) - C_{acc}(s_j) \qquad \text{Eq. (2)}$$

In some embodiments, for a given set of subexpressions S, for at least some queries, there are one or more rewritings $R_k$ of q using different subsets of S. The utility of S for q can be defined to be the maximum evaluation cost reduction that can be achieved by one of the rewritings. Thus, in some embodiments, the subexpression selection component 120 can consider different rewritings in order to select the subexpressions to be materialized. The utility of a subexpression set can be defined as follows: let $q_i$ be a query, S be a set of candidate subexpressions, and, $R_i^{max}$ be the rewriting that leads to the highest cost reduction for $q_i$. The utility $U_S(q_i)$ of S for $q_i$ can be defined as:

$$U_S(q_i) = \sum_{s_i \in R_i^{max}} u_{ij} \qquad \text{Eq. (3)}$$

The utility $U_S(Q)$ of S for the query set $Q$ is the sum of utilities of S for each query in $Q$, i.e., $U_S(Q) = \Sigma_{i=1}^{n} U_S(q_i)$.

Subexpression Interactions

In some embodiments, in order to avoid using redundant subexpressions for evaluating a particular query (e.g., $S_1$ and $S_2$ for $Q_3$ in FIG. 3), the subexpression selection component 120 can take into consideration subexpression interaction. Two candidate subexpressions $s_1$, $s_2$ for query q can be defined as interacting if a tree corresponding to a logical plan of one is a subtree of the other.

In some embodiments, to capture such interactions between candidate subexpressions, the subexpression selection component 120 can define an interaction matrix X to be a symmetric m×m matrix, where m is the number of candidate subexpressions for the query set. Element $x_{jk}$ has value 1 if the $j^{th}$ subexpression interacts with the $k^{th}$ one, otherwise it is 0. A subexpression $s_c$ may appear multiple times in a query. In some embodiments, the subexpression is marked as interacting with another subexpression $s'_c$, if at least one of the occurrences of $s_c$ interacts with $s'_c$ in a query.

Subexpression Cost and Constraints

In some embodiments, the cost of a subexpression is a linear combination of several components, such as the storage footprint required for materialization of the subexpression along with creation and maintenance cost. As described above, in some embodiments, updates in the append-only system are discarded and therefore storage footprint is considered as the only cost component. However, the cost model can easily be extended to consider other components.

In order to reduce calculation complexity, the storage footprint may be considered as the only cost component. In these embodiments, subexpression creation and (incremental) maintenance is not a significant concern. Since a majority of jobs are recurring with a fixed periodicity (e.g., daily), each subexpression can be materialized a first time the subexpression is encountered during execution of a query, computed in a $T_x$ time frame. Having been computed and materialized, the subexpression is then available for reuse for jobs in $T_x$. Hence, the only creation cost is a cost of persisting the subexpression, which in some embodiments is omitted as it is factored in the storage cost. Once $T_x$ is over, the subexpression becomes invalid and will need to be computed and materialized again against a new batch of data in the next time frame. For a subexpression set S, a column vector $b_S=[b_1, b_2, \ldots, b_m]$ can be defined as representing the cost of each of the subexpressions in S. The combined cost $B_S$ of S can be defined as the sum of the costs of its subexpressions. Then, the constraint set C includes a budget $B_{max}$ that $B_S$ has to respect.

Utility-Based Subexpression Selection

In some embodiments, having defined the utility and cost of a subexpression set, the problem formulation of Eq. 1, above, can be rewritten to an equivalent one that selects the subexpression set S with the maximum utility for the query set:

$$\arg\max_{\substack{i=1 \\ S \subseteq \mathcal{S}}} \sum_{i=1}^{n} U_S(q_i) \text{ with } B_S \leq B_{max} \qquad \text{Eq. (4)}$$

Query Rewriting Using Subexpressions

Once the subexpression selection component 120 has selected subexpressions to be materialized, the subexpression utilization component 130 can determine which subexpressions of the set of candidate subexpressions to use when evaluating a particular query of the set of queries (e.g., to minimize query evaluation cost). Information regarding determined subexpressions to be used when evaluating particular query(ies) can be stored and/or provided to the query optimizer 150.

The query optimizer 150 can use the information regarding determined subexpressions to be used when evaluating particular query(ies) to perform rewriting of individual queries, for example, adding additional operation(s) such as data ordering and/or partitioning, as needed.

Subexpression Selection as an ILP

In some embodiments, in determining which subexpressions to be materialized, the subexpression selection component 120 can employ an ILP solver. The ILP formulation can be described as follows. Let $z_j$ be a Boolean variable indicating whether the $j^{th}$ subexpression is selected or not.

Considering a budget $B_{max}$ for the total cost of the selected subexpressions and taking into account Eq. 3, above, Eq. 4 can be rewritten as follows:

$$\text{maximize} \sum_{i=1}^{n} \sum_{s_j \in R_i^{max}} u_{ij} \cdot z_j$$

$$\text{subject to} \sum_{j=1}^{m} b_j \cdot z_j \leq B_{max}$$

Note that $R_i^{max}$ is computed based on: (i) the subexpression utilities $u_{ij}$, (ii) the subexpression selection variables $z_j$ (as a subexpression that is not selected cannot be used for rewriting), and (iii) the subexpression interactions $x_{ij}$ (as the selected subexpressions should not be redundant). These requirements make the formulation non-linear. In some embodiments, in order to solve this non-linear formulation, binary variables $y_{ij}$ are introduced to denote whether the subexpression $s_j$ is selected by query $q_i$ for rewriting. With the binary variables, the above formulation is reduced to the following linear formulation:

$$\text{maximize} \sum_{i=1}^{n} \sum_{j=1}^{m} u_{ij} \cdot y_{ij}$$

$$\text{subject to} \sum_{j=1}^{m} b_j \cdot z_j \leq B_{max}$$

$$y_{ik} + \frac{1}{m} \sum_{\substack{j=1 \\ j \neq k}}^{m} y_{ij} \cdot x_{jk} \leq 1 \ \forall_i \in [1,n], k \in [1,m],$$

$$y_{ij} \leq z_j \ \forall_i \in [1,n] j \in [1,m]$$

The second constraint above uses the interaction matrix X, discussed previously, to ensure that subexpressions that are covered by others in the same query are not used. The left-hand side of this constraint ensures that if the $k^{th}$ view is selected ($y_{ik}=1$), then its interacting views are not selected $$\left(\sum_{\substack{j=1 \\ j \neq k}}^{m} y_{ij} \cdot x_{jk} = 0\right).$$

Otherwise, if the $k^{th}$ view is not selected ($y_{ik}=0$), then one or more of the interacting view(s) can be selected. In some embodiments, $$\sum_{\substack{j=1 \\ j \neq k}}^{m} y_{ij} \cdot x_{jk}$$

can be normalized by m to ensure that the resulting quantity is between 0 and 1. In some embodiments, the second constraint is applied to every view (e.g., $k \in [1,m]$). The last constraint ensures that a subexpression is used for query rewriting only when it is materialized.

Using an ILP solver, there are $2^{m \cdot n}$ combinations to be explored. This is intractable when m and n are in the order of a million. Therefore, an approximation scheme to scale subexpression selection to larger workloads is presented below.

As discussed in greater detail below, in some embodiments, the subexpression selection component 120 can scale subexpression selection to larger workloads. In some embodiments, in order to facilitate quicker convergence, the ILP formulation utilized by the subexpression selection component 120 can be adapted to one or more of (1) one subexpression per query, (2) fair subexpression selection and/or (3) robust subexpression selection.

One Subexpression Per Query

In some embodiments, in order to reduce a number of rewritings considered, the subexpression selection component 120 allows at most one subexpression to be used for each query. In order to achieve this, the second constraint in the ILP formulation is adjusted as follows:

$$\sum_{j=1}^{m} y_{ij} \leq 1 \ \forall_i \in [1, n]$$

This will select up to one subexpression per query that maximizes the overall subexpression utility for the query set, subject to the cost constraints. The subexpression selection component 120 does not need to maintain the interaction matrix X. In some embodiments, this restricted version leads to a faster selection process but can result in a lower quality of selected subexpressions.

Fair Subexpression Selection

In some embodiments, the subexpression selection component 120 can select subexpressions among a plurality of tenants (e.g., in the cloud). For example, for p tenants, with queries in tenant $p_k$ denoted as $Q$ pk, the subexpression selection component 120 can support fair subexpression selection by extending the cost budget constraint as follows:

$$\sum_{i \in Qp_k} \sum_{j=1}^{m} b_j \cdot z_j \cdot y_{ij} \leq B_{p_k}$$

$$\forall \ p_k \in [1, p]$$

The per-tenant allocation $B_{pk}$ could be determined using different cache allocation strategies, such as (proportional) fairness.

Robust Subexpression Selection

The problem formulation, discussed above, aims to improve the overall workload performance. However, the improvements per query or per user account could be arbitrary, which makes it hard to set the expectations of the system's users. To this end, the problem formulation can be extended to select subexpressions which give similar utilities across all queries or accounts. The idea is to adjust the total utility for a query with the deviation of that utility from the average. Considering the average utility to be $u_{avg}$, the percentage utility error $e_i$ for a query $q_i$ is defined as follows:

$$e_i = \frac{\left(\sum_{j=1}^{m} u_{ij} \cdot y_{ij}\right) - u_{avg}}{u_{avg}} \cdot 100$$

In some embodiments, the error per account (instead of per query) can be computed similarly. Using the defined error $e_i$, the subexpression selection component 120 can adjust the total utility for query $q_i$ as follows:

$$u_i^{adj} = \frac{1}{e_i^\alpha} \cdot \sum_{j=1}^{m} u_{ij} \cdot y_{ij}$$

Parameter $\alpha$ controls how fast the subexpression selection component 120 converges towards the average utility. The objective then becomes to maximize the total adjusted utility $\Sigma_{i=1}^{n} u_i^{adj}$. In some embodiments, while $u_{avg}$ makes the problem non-linear, solving the ILP using an iterative algorithm, as discussed below, the subexpression selection component 120 can bypass the non-linearity by treating $u_{avg}$ as a constant at each iteration.

Scaling Subexpression Selection

As discussed above, in some embodiments, the system 100 maps selection of subexpressions to be materialized to a bipartite graph labeling problem with constraints. In some embodiments, an algorithm as described below can be employed for solving the bipartite graph labeling problem in parallel. In some embodiments, the system 100 can leverage existing distributed execution platforms to execute algorithm 1.

Bipartite Graph Labeling Problem

As noted previously, in some embodiments, the system 100 maps selection of subexpressions to be materialized to a bipartite graph labeling problem with constraints. The ILP problem formulation discussed above can be split into multiple smaller ILPs by mapping it to a labeling problem over a bipartite graph. Let $Q$ be a set of n queries and S be the set of m candidate subexpressions for the queries in $Q$. Consider a bipartite graph $G=(V_Q, V_S, E)$, where each vertex $v_{q_i} \in V_Q$ corresponds to query $q_i \in Q$, and each vertex $v_{s_j} \in S$ corresponds to subexpression $s_j \in S$. There is an edge $e_{ij} \in E$ between $v_{q_i}$ and $v_{s_j}$, if $s_j$ is a subexpression of $q_i$. Each edge $e_{ij}$ is also associated with $u_{ij}$ representing the utility of $s_j$ for $q_i$. As discussed above, in some embodiments, $x_{jk}$ can be used to capture the subexpression interactions, as well as $b_j$ and $B_{max}$ to represent the storage footprint of $s_j$ and the total storage capacity, respectively.

In some embodiments, the subexpression selection component 120 can perform selection based on the following graph labeling problem:

(i) Assign a 0-1 label $z_j$ to each vertex $v_{s_j} \in V_S$, subject to the following constraint:

$$\sum_{j=1}^{m} b_j \cdot z_j \leq B_{max} \quad \text{Eq. (5)}$$

(ii) assign a 0-1 label $y_{ij}$ to each edge $e_{ij} \in E$, subject to the following optimization:

$$\text{maximize} \sum_{j=1}^{m} u_{ij} \cdot y_{ij} \quad \text{Eq. (6)}$$

$$\text{subject to } y_{ik} + \frac{1}{m} \sum_{\substack{j=1 \\ j \neq k}}^{m} y_{ij} \cdot x_{jk} \leq 1 \ \forall_k \in [1, m] \quad \text{Eq. (7)}$$

$$y_{ij} \leq z_j \ \forall \ j \in [1, m] \quad \text{Eq. (8)}$$

As discussed above regarding ILP formulation, the $z_j$ labels denote whether a subexpression $s_j$ will be materialized, and the $y_{ij}$ labels denote whether $s_j$ will be used when evaluating $q_i$. Eq. 5 guarantees that the chosen $z_j$ values will respect the storage capacity, while Eq. 6-8 find the rewritings with the highest utility for each query given some $z_j$ values. The $z_j$ values that maximize the total utility for all queries is equivalent to the solution of the global ILP discussed above.

Figure 4A:
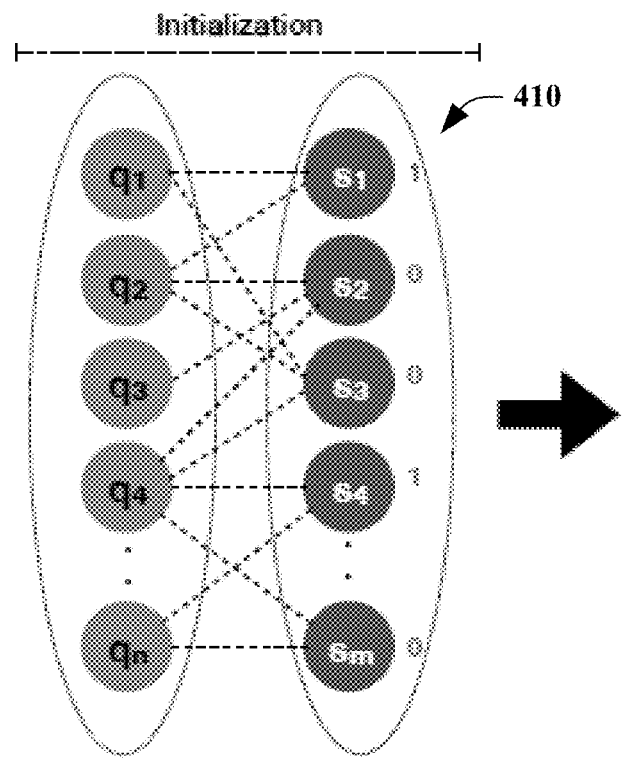
FIGS. 4A-4E are diagrams illustrating transitions of an exemplary bipartite graph, vertex-centric algorithm.
Figures 4B, 4C:
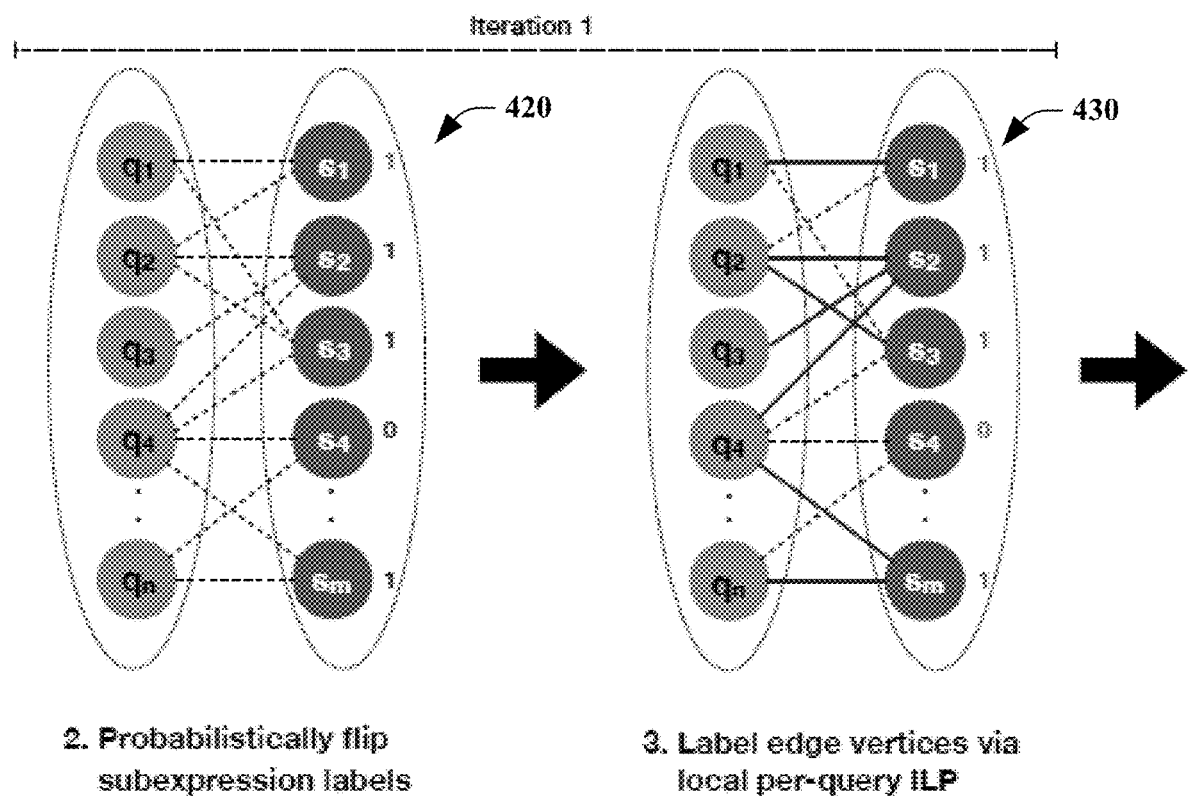
Figures 4D, 4E:
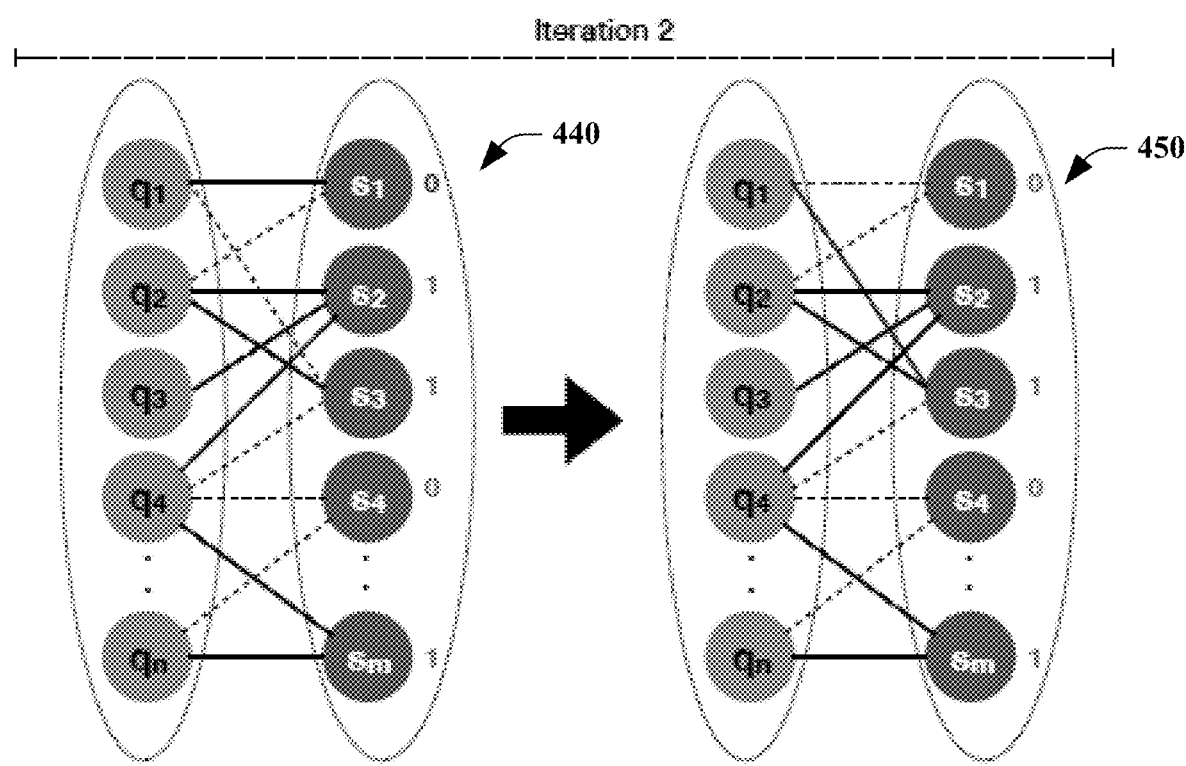

Turning to FIGS. 4A-4E, diagrams illustrating transitions of an exemplary bipartite graph, vertex-centric algorithm discussed below are provided. Referring to FIG. 4A, an initial bipartite graph 410 in which the vertices represent n queries and m subexpressions, and the edges connect queries with their subexpressions (e.g., $s_1$ and $s_3$ are subexpressions of $q_1$). For purposes of explanation, the system 100 can assume that each subexpression has a storage footprint of 1, and an overall budget for materialization is 3. FIG. 4(E) illustrates a bipartite graph 450 upon completion of a second iteration and thus represents a solution to the graph labeling problem. The subexpression label is shown next to the respective vertex. For the edge labels, solid lines are used to denote 1-labeled edges and dashed lines for 0-labeled ones. In this instance, subexpressions $s_1$, $s_2$ and $s_m$ are chosen to be materialized. Query $q_1$ will be evaluated using $s_1$, $q_2$ using $s_1$ and $s_2$, etc.

In some embodiments, in contrast to the ILP formulation discussed above, by using the above graph labeling formulation, the system 100 can isolate the problems of finding which subexpressions to materialize ($z_j$) and which subexpressions to use when evaluating each query ($y_{ij}$). This approach has two major benefits: (i) instead of solving a single giant ILP, a number of much smaller ILPs are solved which are computationally feasible, and (ii) by splitting the problem to several sub-problems that can be executed independently, the system 100 can execute one or more in parallel.

Vertex-Centric Algorithm

An approximate algorithm to solve the bipartite graph label problem efficiently is presented. The algorithm solves smaller ILPS (Eq. 6-Eq. 8) at each query vertex, while the algorithm attempts to fulfill the global constraint in Eq. 5 at each subexpression vertex.

Overview

In some embodiments, the vertex-centric algorithm follows an iterative approach. Each iteration includes two steps: (i) assign labels to the subexpression vertices, and (ii) given the subexpression vertices determined at the first step, assign labels to the edges. This two-step process is repeated until there is no change to the vertex and edge labels or until a predefined number of iterations is reached.

Algorithm 1 is outlined as follows:

---
Algorithm 1
---
Input: G=($V_Q$; $V_S$; E), subexpression utilities $u_{ij}$, interactions $x_{jk}$, storage footprints $b_j$, storage budget $B_{max}$, iterations k
Output: subexpressions to materialize $z_j$, subexpressions to use when evaluating each query $y_{ij}$
1   Initialize($z_j$)                                  // initialize $V_S$ labels
2   $y_{ij}$ = 0, $\forall e_{ij} \in E$               // initialize E labels
3   $B_{cur} = \Sigma_j b_j \cdot z_j$                 // current budget used
4   $U_{max} = \Sigma_{i,j} u_{ij}$                    // upper bound for total utility
5   $U_{max}^j = \Sigma_i u_{ij}$ Uj                   // upper bound for utility of $_{sj}$
6   iter = 0
7   while updated or iter < k do
        // Subexpression vertex labeling
8       foreach $v_j$ Σ Vs do
9           updated = 0

---
Algorithm 1 -continued
---
10          $p_{flip}^j$ = FlipP($b_j$, $B_{cur}$, $U_{cur}$, $U_{cur}^j$)
11          $Z_j^{new}$ = DoFlip($p_{flip}$)
12          if $Z_j^{new}$ != $z_j$ then
13              updated = 1
14              if $Z_j^{new}$ == 0 then
15                  $B_{cur}$ −= $b_j$
16              else
17                  $B_{cur}$ += $b_j$
18              $z_j = Z_j^{new}$
        // Edge labeling
19      $U_{cur}$ = 0                                  // current total utility
20      $U_{cur}^j$ = 0                                // current utility of each $s_j$
21      foreach $v_i \in$ Vs do
22          $M_i$ = {j: $e_{ij} \in$ E & j : $u_{ij} > 0$}
23          $M_i'$ = {j: $e_{ij} \in$ E & $z_j > 0$}
24          $y_{ij}$ = LocalILP($u_{ij}$, $x_{jk}$)    // solve local ILP
25          $U_{cur}$ += $\Sigma_{j \in M_i \cap M_I} u_{ij} \cdot y_{ij}$
26          foreach j: $e_{ij} \in$ E do
27              $U_j$ += $u_{ij} \cdot y_{ij}$
28      iter++
29  return $z_j$, $y_{ij}$

---

In some embodiments, all or at least some of algorithm 1 is performed by the subexpression selection component 120. Algorithm 1 takes as input a bipartite graph G encoding the n queries and their m candidate subexpressions, along with the subexpression utilities $u_{ij}$, interactions $x_{jk}$ and storage footprints $b_j$, and the maximum allowed number of iterations k. Algorithm 1 outputs the subexpressions to be materialized $z_j$ and the subexpressions to be used when evaluating each query $y_{ij}$. In some embodiments, various optimization(s) can be performed on algorithm 1, as discussed below.

Algorithm 1 begins with first assigning labels to the subexpression vertices (e.g., randomly) and 0-labels to the edges (lines 1-2). Various auxiliary variables, discussed below, are also initialized (lines 3-6). Thereafter, an iterative part of algorithm 1 is performed. A probabilistic approach is used for the subexpression vertex labeling portion, which allows for decisions to be performed without central coordination (line 8-18). Based on a current utility and used budget, the probability of changing the label of a vertex is calculated. The edge labeling portion is performed done by solving local ILP problems (lines 21-26).

Referring briefly to FIGS. 4A-4E, a first two iterations of algorithm 1 are illustrated. FIG. 4(a) illustrates the initial bipartite graph 410 upon initialization (FIG. 4(A)). In a first iteration, given algorithm 1 is below the capacity budget $B_{max}$=3, so the labels of $s_2$, $s_3$, $s_4$ and $s_m$ are flipped as illustrated in bipartite graph 420 of FIG. 4B. Given the new labels, algorithm 1 chooses rewritings for each of the queries to maximize each query's utility, while respecting subexpression interactions (e.g., $s_3$ with $s_3$ for $q_1$) as illustrated in bipartite graph 430 of FIG. 4C. In a second iteration, given that algorithm 1 is above budget, algorithm 1 chooses to not materialize $s_1$ as illustrated in bipartite graph 440 of FIG. 4D. Accordingly, algorithm 1 changes the labels of the edges adjacent to $q_1$ to use $s_3$ instead of $s_1$ as illustrated in bipartite graph 450 of FIG. 4E.

Details of the vertex and edge labeling steps and an analysis of algorithm 1 for some embodiments are discussed below.

Labeling Subexpression Vertices

The goal of algorithm 1 is to assign 1-labels to the subexpressions that will lead to the highest utility, while abiding by the budget constraint of Eq. 5. To perform distributed decisions in the presence of this global aggregation constraint, labels are assigned probabilistically. In some embodiments, algorithm 1 iterates over all subexpressions, and for each subexpression $s_j$, algorithm 1 calculates the probability $p_{flip}^j$ of changing the current $s_j$ label (lines 10-11 in algorithm 1), taking into account both the budget $B_{cur}$ used by the currently selected subexpressions and the contribution $U_{cur}^j$ of $s_j$ to the current total utility $U_{cur}$ of the selected subexpressions. In particular, in some embodiments, the following formulas for the probabilities are utilized by algorithm 1:

$$p_{capacity}^j = \begin{cases} 1 - \frac{B_{cur}}{B_{max}} & \text{if } B_{cur} < B_{max} \\ 1 - \frac{B_{max}}{B_{cur}} & \text{otherwise} \end{cases}$$

$$p_{utility}^j = \begin{cases} \frac{u_{max}^j / b_j}{U_{max} / B_{max}} & 1 - \frac{U_{cur}^j}{U_{cur}} \text{ if } z_j = 1 \\ & \text{if } iter \leq p \text{ or } B_{cur} \leq B_{max} - b_j \\ 0 & \text{otherwise} \end{cases}$$

$$p_{flip}^j = p_{capacity}^j \cdot p_{utility}^j$$

The intuition in computing $p_{flip}^j$ is twofold: (i) the further algorithm 1 is flip from the storage budget, the higher the probability of flipping labels should be, as captured by the $p_{capacity}$ component; (ii) the higher the current utility of a 1-labeled subexpression (i.e., a subexpression that is currently selected for materialization), the lower the chances it will be unselected (first case of $p_{utility}$) while the higher the potential benefit of a 0-labeled one, the higher the chances it will be selected (second case of $p_{utility}$). In some embodiments, Logarithmic or exponential normalization can be applied to make the distribution more uniform in the [0,1] interval. The potential benefit $U_{max}^j$ of a 0-labeled subexpression can be defined as the total utility if it were to be used by all possible queries. Similarly, $U_{max}$ is the sum of $U_{max}^j$ over all subexpressions.

Note that with $p_{flip}^j$, algorithm 1 strikes a balance between avoiding local optima and converging to a solution reasonably fast. To improve convergence speed, after p % of the maximum allowed number of iterations k, algorithm 1 only turns a label of a subexpression from 0 to 1 if the maximum budget is respected even after the added budget of this subexpression (e.g., stricter iterations). In some embodiments, good results can be obtained by setting p=80%; however, lower value(s) can be used if convergence speed is more important than solution quality.

After performing the label flipping, algorithm 1 further updates the counter for the currently used capacity $B_{cur}$ (lines 12-17).

Labeling Edges

Given the subexpressions chosen in the vertex-labeling step, algorithm 1 then determines which subexpressions will be used to evaluate each query by labeling the edges that are adjacent to that query, following the optimization goal in Eq. 6 and respecting the constraints in Eq. 7 and Eq. 8. To simplify this optimization, the observation can be made that a subexpression $s_j$ cannot be used to evaluate a query $q_i$ (i.e., $y_{ij}=0$) when it has no utility for $q_i$ ($u_{ij}=0$) or when it is not materialized ($z_j=0$). Accordingly, in some embodiments, the sets $M_i=\{j: u_{ij}>0\}$ and $M'_i=\{j: z_j>0\}$ are defined. Using these sets, algorithm 1 can significantly reduce the dimensions of $y_{ij}$ and the number of constraints needed to be considered in the optimization, as follows:

$$\text{maximize} \sum_{j \in M_i \cap M'_i}^{m} u_{ij} \cdot y_{ij} \qquad \text{Eq. (9)}$$

$$\text{subject to } y_i + \frac{1}{m} \sum_{\substack{j \in M_i \cap M'_i \\ j \neq k}}^{m} y_{ij} \cdot x_{jk} \leq 1 \, \forall_k \in M_i \cap M'_i \qquad \text{Eq. (10)}$$

$M_i$ is known statically for each query vertex in the graph, while $M'_i$ is determined by the subexpressions that were selected in the subexpression vertex-labeling step of this iteration. In some embodiments, algorithm 1 lets each query vertex $v_{q_i}$ keep track of $u_{ij}$ and $x_{ij}$ for $j \in M_i \cap M'_i$. Note that in this case $u_{ij}$ is a $1 \times |M_i \cap M'_i|$ vector and $x_{jk}$ is a $|M'_i \cap M'_i| \times |M_i \cap M'_i|$ matrix, both significantly smaller than before. As a result, the above ILP problem can be computed locally at each query vertex in the graph to determine the labels of its adjacent edges (line 23 in algorithm 1).

Analysis

Instead of solving a single global ILP, with algorithm 1, n ILPs are solved, where the size of each problem is the average effective degree d of query vertices, i.e., $d_i = avg|M_i \cap M'_i|$. Additionally, algorithm 1 labels each of the m subexpression vertices. Thus, the average case complexity of algorithm 1 is given as $k \cdot (m+n \cdot 2^{max \, d_i})$, where k is the number of iterations. Note the d is bounded by either the largest query size or the maximum number of subexpressions allowed to be used in a given query. In that case, algorithm 1 scales linearly with the sum of the number of queries and the number of subexpressions, i.e., (m+n).

Next, with respect to correctness of algorithm 1, recall that the ILP formulation has three constraints for exact optimal solution. The first constraint limits the total cost to $B_{max}$. Since algorithm 1 is an approximate algorithm with each subexpression vertex making independent decisions on whether to flip their labels, this constraint is not strictly observed. To determine whether the final cost comes close to $B_{max}$, since the first p % iterations are designed to explore interesting subexpressions, consider the remaining (1−p/100)·k stricter iterations. For these iterations, a flip from 0 to 1 is only possible if the total cost is within $B_{max}$ (the second case of $p_{utility}^j$). Reviewing the other case when the cost is overshooting the budget and a flip from 1 to 0 is supposed to happen, the corresponding probability is given as:

$$p_{flip}^j = \left(1 - \frac{U_{cur}^j}{U_{cur}}\right)\left(1 - \frac{B_{max}}{B_{cur}}\right).$$

Thus, the total cost in iteration t+1 is given as $B_{cur}^{t+1} = B_{cur}^t - \sum_{j=1}^{m} p_{flip}^j \cdot b_j$. Assuming that there is a set of very low utility subexpressions $$\frac{u_{cur}^j}{u_{cur}} \approx 0$$

that should be flipping their labels from 1 to 0, the cost in iteration t+1 can be approximated as $$B_{cur}^{t+1} = B_{cur}^t - \left(1 - \frac{B_{max}}{B_{cur}}\right) \cdot B_{total},$$

where $B_{total}$ is the total cost of those low utility expressions. Expecting low utility subexpressions to flip is the stricter case; otherwise, $B_{total}$ is simply a fraction of the total cost of all subexpressions and the proof still holds.

Figure 5:
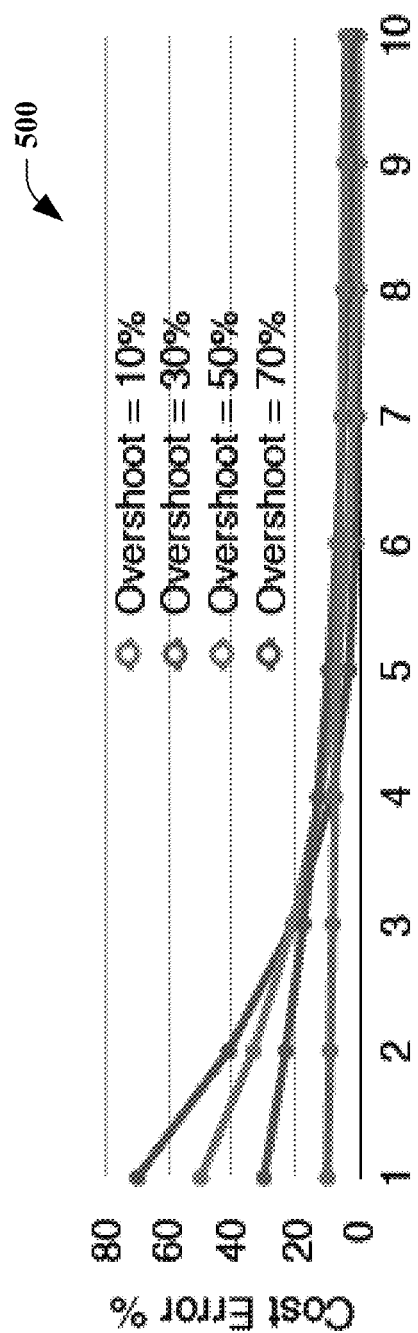
FIG. 5 is a diagram illustrating an exemplary cost budget error vs. number of iterations.

Referring to FIG. 5, a diagram 500 illustrating an exemplary cost budget error over the last $(1-p)\cdot k$ iterations is provided. From top to bottom, the diagram 500 depicts overshoot of 70%, 50%, 30 and 10% of cost error percentage vs. number of iterations. The cost error $$\frac{B_{cur} - B_{max}}{B_{max}} \cdot 100,$$

approaches $B_{max}$ as the number of iterations increases. In some embodiments $B_{total} = B_{cur}^0 - B_{max}$, that is, the total weight of low utility subexpressions is equal to the cost overshoot.

The second constraint in the ILP formulation applies restrictions to subexpression interaction for each query, thereby making it readily partitionable across query vertices (as done in Equation 10 of the local ILP). The final constraint in the global ILP, i.e., $y_{ij} \leq z_j$, is enforced by construction of M' since each of the smaller ILPs have all $z_j$ as ones.

With respect to convergence, in some embodiments, focusing again on the last $(1-p)\cdot k$ stricter iterations, observe that for a given set of subexpression vertex labels, the local ILPs will always find a fixed solution, and hence $U_{cur}$ will converge. Even when the subexpression vertex labels flip from 0 to 1, the flipping stops once the cost budget is reached (the second case of $p_{utility}^j$), and so $U_{cur}$ will again converge. Considering the remaining case of subexpression vertex labels flipping from 1 to 0, the probability of such flipping is given as:

$$p_{flip}^j = \left(1 - \frac{U_{cur}^j}{U_{curr}}\right)(1 - B_{ratio}),$$

where $B_{ratio}$ is either $$\frac{B_{cur}}{B_{max}} \text{ or } \frac{B_{max}}{B_{cur}}$$

depending on whether $B_{cur} < B_{max}$. Assuming that every subexpression that flips its label to 0 was used in at least one of the queries (otherwise, it does not impact $U_{cur}$ anyway), the new total utility in iteration $t+1$ is given as: $U_{cur}^{t+1} = U_{cur}^t - \sum_{j=1}^m p_{flip}^j \cdot U_{cur}^j$. Expanding the terms yields:

$$U_{cur}^{t+1} = B_{ratio} \cdot U_{cur}^t + \frac{1 - B_{ratio}}{U_{cur}^t} \sum_{j=1}^m U_{cur}^j \cdot U_{cur}^j.$$

Using Cauchy-Schwarz inequality:

$$\left(B_{ratio} + \frac{1 - B_{ratio}}{m}\right) \cdot U_{cur}^t \leq U_{cur}^{t+1} \leq U_{cur}^t.$$

As discussed above with respect to correctness, $B_{cur}$ converges to $B_{max}$, i.e., $B_{ratio}$ converges to 1, and as a result $U_{cur}^{t+1}$ converges as well.

Note that the probabilistic graph labeling algorithm does not guarantee halting at the optimal solution, and might instead end up in a local optimum (e.g., similar to iterative hill-climbing algorithms).

Distributed Execution

In some embodiments, execution of algorithm 1 can be scaled-out using a distributed execution framework. As described in algorithm 1, in each iteration of algorithm 1, each subexpression vertex is first examined to determine its label, and then each query vertex is examined to determine the labels of its adjacent edges. Given that label assignments are performed locally to the graph's vertices, algorithm 1 fits well with vertex-centric graph processing model(s). In some embodiments, using vertex-centric graph processing model, vertex assigns a label to itself or to its adjacent edges, based on whether it is a subexpression or a query vertex, respectively, and then sends messages containing the newly assigned labels to all its neighbors. Thus, a vertex-centric graph system can execute algorithm 1 in a distributed fashion.

Similarly, in some embodiments, instead of using a dedicated graph engine, algorithm 1 can be executed using a standard Structured Query Language (SQL) engine. This can be useful in a setting in which preprocessing, i.e., extracting queries and generating subexpressions, is already done, for example, via SCOPE, which is a SQL-like processing engine. Therefore, in some embodiments, to avoid stitching together multiple engines and moving data across the multiple engines, algorithm 1 can be executed on SCOPE.

An implementation of algorithm 1 using the SCOPE query language is illustrated as follows:

LISTING 1

```
1   Vq=REDUCE (SSTREAM @repeatedSubexpressions)
2   ON JobGUID
3   USING InitJobVertices( );
4   Vs=SELECT HashTag AS vj, Size AS bj, InitZj( ) AS zj
5   FROM (SSTREAM @repeatedSubexpresssions)
6   GROUP BY HashTag,Size;
7   E=SELECT JobGUID AS vi, HashTag AS vj
8   FROM (SSTREAM @repeatedSubexpressions);
9
10  Umax=SELECT SUM(InclusiveTime) AS umax
11  FROM (SSTREAM @repeatedSubexpressions);
12  Bmax=SELECT SUM(vj) AS bmax FROM Vs;
13
14  LOOP(i,@maxIter)
15  {
16
17      Vs=REDUCE(
18          SELECT * FROM Vq
19          INNER JOIN E ON Vq.vi==E.vi
20          INNER JOIN Vs ON E.vj==Vs.vj
21          CROSS JOIN Cu
22          CROSS JOIN Cb
23          CROSS JOIN Umax
24          CROSS JOIN Bmax
25      )
26      ON vj
27      USING ProbabilisticLabels(@B,@i,@maxIter);
28
29      U_cur=SELECT SUM(ScalarProduct(uij,yij)) AS u_cur
30      B_cur=SELECT SUM(bj*zj) AS b_cur FROM Vs;
31
32      Vq_update=REDUCE(
33          SELECT vi,uij,xij,vj FROM Vq
34          INNER JOIN E ON Vq.vi==E.vi
35          INNER JOIN Vs ON E.vj==Vs.vj
36          WHERE zj>0
37      )
38      ON vi
```

LISTING 1

```
39         USING SolveLocalILP( );
40
41    Vq=SELECT Vq.vi, Vq.uij, Vq.xij,
42         (Vq_update.uij==null ? Vq.yij : Vq_update.yij) AS yi
43         FROM Vq LEFT JOIN Vq_update
44         ON Vq.vi==Vq_update.vi;
45    }
46
47    Vs_selected = SELECT * FROM Vs WHERE zj>0;
48    OUTPUT Vs_selected TO @selectedSubexpressions
```

Note that candidate subexpressions are generated and stored upfront. Then, the three tables: $V_Q$ ($v_i$, $u_i$, $x_i$, $y_i$), $V_S$(vj, bj, $z_j$), and E($v_i$, $v_j$) are created (lines 1-8), and also set the values of $U_{max}$ and $B_{max}$. Thereafter, in each iteration the three tables ($V_Q$, $V_Q$, E) are joined and aggregate alternatively on $V_Q \cdot v_j$ and $V_Q \cdot v_i$, respectively, to assign the vertex and edge labels (lines 14-44). The subexpression vertices are updated with new labels (lines 17-27) and the new $V_S$ is used to assign the edge labels. $V_Q$ is left-joined with the updated query vertices ($V_Q$ update) in order to obtain the new $V_Q$, which will be used in the next iteration (lines 32-44). Finally, $V_Q$ elements with $z_j>0$ are returned, i.e., those that are chosen for materialization (lines 42-43).

Optimizations

In some embodiments, one or more optimizations can be performed to improve performance of the local per-query ILP problems solved at each iteration of the graph labeling algorithm discussed above. Optimization of the local ILPs is focused upon, since labeling subexpression vertices is done in constant time, while the local ILPs can be arbitrarily large, due to possible skew in the size of the queries in the workload, thereby causing an entire iteration to block waiting for completion of the local ILP.

Branch-and-Bound

To solve the local ILPs (line 23 of Algorithm 1), in some embodiments, a naive approach considers all combinations (i.e., the power set) of candidate subexpressions and selects the one with the maximum utility (objective function of Eq. 9) that does not have interacting subexpressions (constraint of Eq. 10). In some embodiments, a generic ILP solver is used, which is not tailored towards the specific use case either. In some embodiments, the local ILPs are solved using a branch-and-bound technique.

Figure 6:
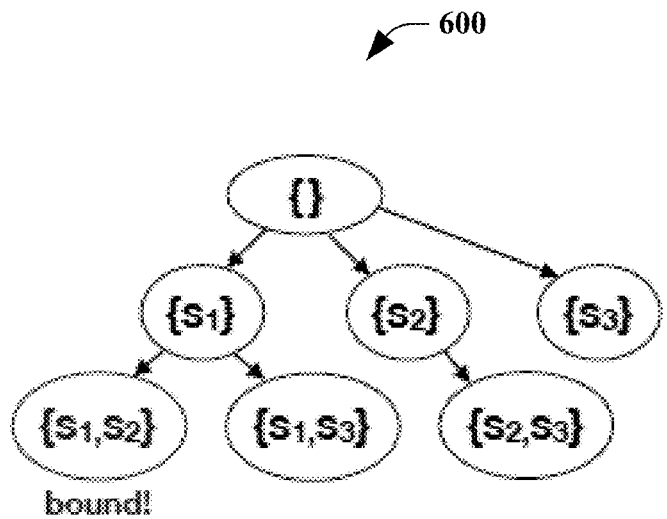
FIG. 6 is a diagram illustrating an exemplary pruning technique.

For the branch-and-bound technique, the idea is that once interacting subexpressions are found, any superset of these subexpressions are no longer considered, as those will also violate the interaction constraints. FIG. 6 is a diagram 600 that illustrates the technique through an example including three subexpressions $s_1$, $s_2$, $s_3$, with $s_1$ interacting with $s_2$. When the set $\{s_1, s_2\}$ is visited, the search space below it is pruned, and thus $\{s_1, s_2, s_3\}$ is never explored. This can lead to significant pruning, especially in the presence of many interacting subexpressions.

Algorithm 2 shows the pseudocode for solving the ILP using the branch-and-bound technique:

Algorithm 2

Input: $u_{ij}$: 1 × m vector of utilities for query $q_i$
       $x_{jk}$:   m × m subexpression interaction matrix
Output: $y_{ij}$: subexpressions to use for evaluating qi (eval. vector)
       // Initialize to 0s
1    $y_{ij}^{cur}$ = AllZeros( )         // current eval. vector
2    $y_{ij}^{best}$ = AllZeros( )        // best eval. vector Algorithm 2

```
3     BranchAndBound( y_ij^cur,0)
4     return y_ij^best
5     Function BranchAndBound( y_i^cur,j_s)
6         if IsInteracting( y_ij^cur , x_jk) then
7             return                // bound if interaction found
8         if j_s == m then
9             if Utility( y_ij^cur j ) > Utility( y_ij^best ) then
10                y_ij^best = y_ij^cur     // update best
11            return
12        y_ij^cur [j_s] = 1        // attempt to use js-th subexpr.
13        BranchAndBound( y_ij^cur,j_s +1)
14        y_ij^cur [j_s] = 0                          // backtrack
15        BranchAndBound( y_i^cur,j_s +1)
```

Algorithm 2 takes as input the vector with the utility $u_{ij}$ of each candidate subexpression $s_j$ for query $q_i$ and the interaction matrix $x_{jk}$ between subexpressions. Note that at this point the number of subexpressions is at most m; in practice it is much smaller after the dimensionality reduction, discussed above, since here only subexpressions that have already been selected for materialization are considered. Different evaluation vectors can be recursively explored (i.e., vectors that denote whether a subexpression will be used in evaluating $q_i$), and return the one that yields the maximum utility. During exploration, whether the current vector has interacting subexpressions can be checked and the exploration bounded if this is the case (lines 6-7 in Algorithm 2). Each time a complete evaluation vector is reached (i.e., one in which values have been given to all subexpression elements), its utility can be checked using Eq. 6 and best vector found so far can be updated if its utility has been exceeded (lines 8-11). Otherwise, algorithm 1 branches with and without setting the $j^{th}$ subexpression element to 1 (lines 12-15).

Exploration Strategies

Figure 7:
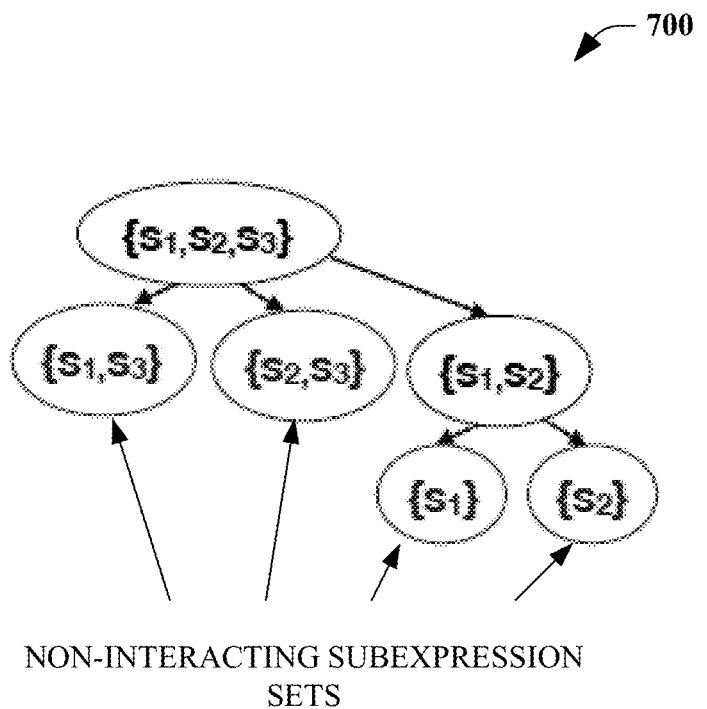
FIG. 7 is a diagram illustrating another exemplary pruning technique.

In some embodiments, different exploration strategy(ies) can be employed to aid in better pruning. The branch-and-bound algorithm discussed so far (Algorithm 2) explores the subexpression space in a bottom-up fashion, i.e., it incrementally adds more subexpressions until an interaction is found. In some embodiments, the search space can be explored in a top-down fashion, i.e., select all subexpressions and incrementally drop one-by-one until reaching a non-interacting set. FIG. 7 is a diagram 700 that illustrates a top-down exploration for the running example. Here all three subexpressions are selected at the start, and by removing $s_1$ or $s_2$ non-interacting subexpression sets are reached. When there are few interactions between the subexpressions, this technique can lead to solutions faster. Moreover, given that the utility function is monotonically decreasing when subexpressions are removed, exploration can further be bounded when a set whose utility is below the best utility so far is found.

As already discussed, bottom-up exploration tends to be beneficial in case of highly interactive candidate subexpressions, while top-down exploration is more beneficial in the presence of few interactions. In some embodiments, an exploration direction can be dynamically selected based on the frequency of non-zero elements in the interaction matrix X. Specifically, for an m×m interaction matrix, an interaction fraction can be defined as NonZeros(X)/(m(m−1)). When the interaction fraction is greater than a threshold, the top-down exploration can be selected, follow the bottom-up exploration can be selected.

In some embodiments, taking the dynamic exploration a step further, it can be observed that at each branching step of the branch-and-bound, the interaction fraction for the remaining subexpressions to be considered varies. Therefore, instead of selecting an approach upfront, an adaptive decision to use a bottom-up or a top-down approach can be made at each step of algorithm 1.

Skipping Trivial States

Figure 8:
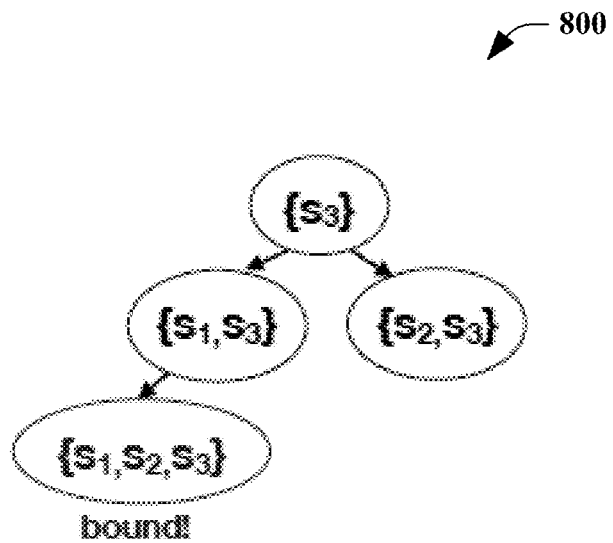
FIG. 8 is a diagram illustrating yet another exemplary pruning technique.

In some embodiments, one or more additional techniques are employed to avoid trivial states of the exploration and thus reach a high-utility solution faster. Notice that subexpressions that do not interact with others will be part of the best solution since the utility increases monotonically as more subexpressions are added. Selecting such subexpressions upfront, instead of starting with the all-zero $y_{ij}$ vector, can significantly reduce the search space. FIG. 8 is a diagram 800 illustrating that this technique reduces the search space by three for the running example.

Figure 9:
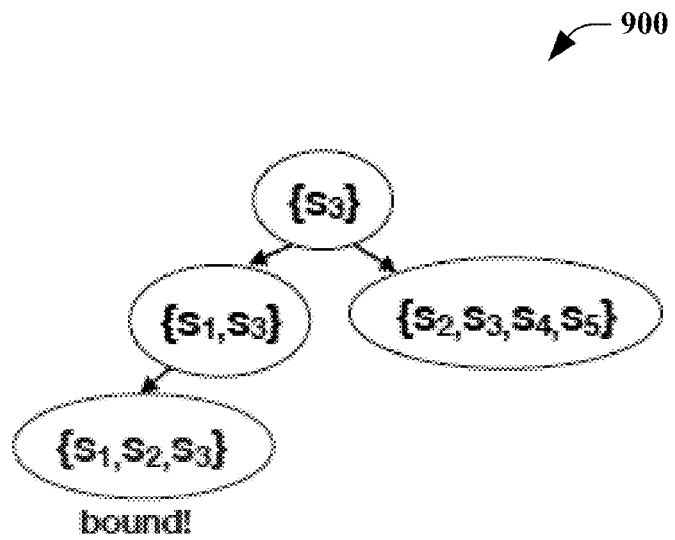
FIG. 9 is a diagram illustrating another exemplary pruning technique.

Similarly, in some embodiments, while exploring the solution search space, subexpressions that do not interact with any of the remaining elements can be found. Thus, in each iteration, whether there exist such remaining subexpressions can be checked, and if so, the corresponding $y_{ij}$ elements can be directly set to 1. In the running example, consider two new elements, $s_4$ and $s_5$, which interact only with $s_1$. As shown in FIG. 9 which illustrates a diagram 900, the new elements can immediately be included to the $\{s_2,s_3\}$ set, as this will lead to no interactions.

In some embodiments, the ILPs for queries whose subexpressions' labels have not changed since the last vertex labeling iteration of Algorithm 1 can be skipped. This requires keeping track of the previous subexpression vertex labels.

Evaluation

In this section, an evaluation of the subexpression selection algorithm over both production and synthetic workloads is presented. The production workloads used in this paper are derived from SCOPE jobs that are predominantly run in particular clusters. Briefly, SCOPE exposes a SQL-like query language in which users write scripts that are then compiled to Dryad DAGs and subsequently executed on the shared cluster.

The evaluation is split in two main parts. First, the benefit of algorithm 1 on production workloads at particular analytics clusters is assessed, both in terms of workload sizes it can support and improvement over heuristic-based approaches. Second, a detailed analysis of algorithm 1 is performed, including scalability on a single machine, the pruning effectiveness of proposed optimizations, and the convergence.

In summary, the evaluation provides the following:

Algorithm 1 handles large production workloads comprising tens of thousands of jobs, significantly outperforms heuristics-based approaches by up to three orders of magnitude, and can potentially save 10-40% machine-hours. (Table 1 and FIG. 10). Each job includes tasks that are executed in the cluster in parallel. The sum of execution times of all its tasks are defined as machine-hours of a job.

Figure 11A:
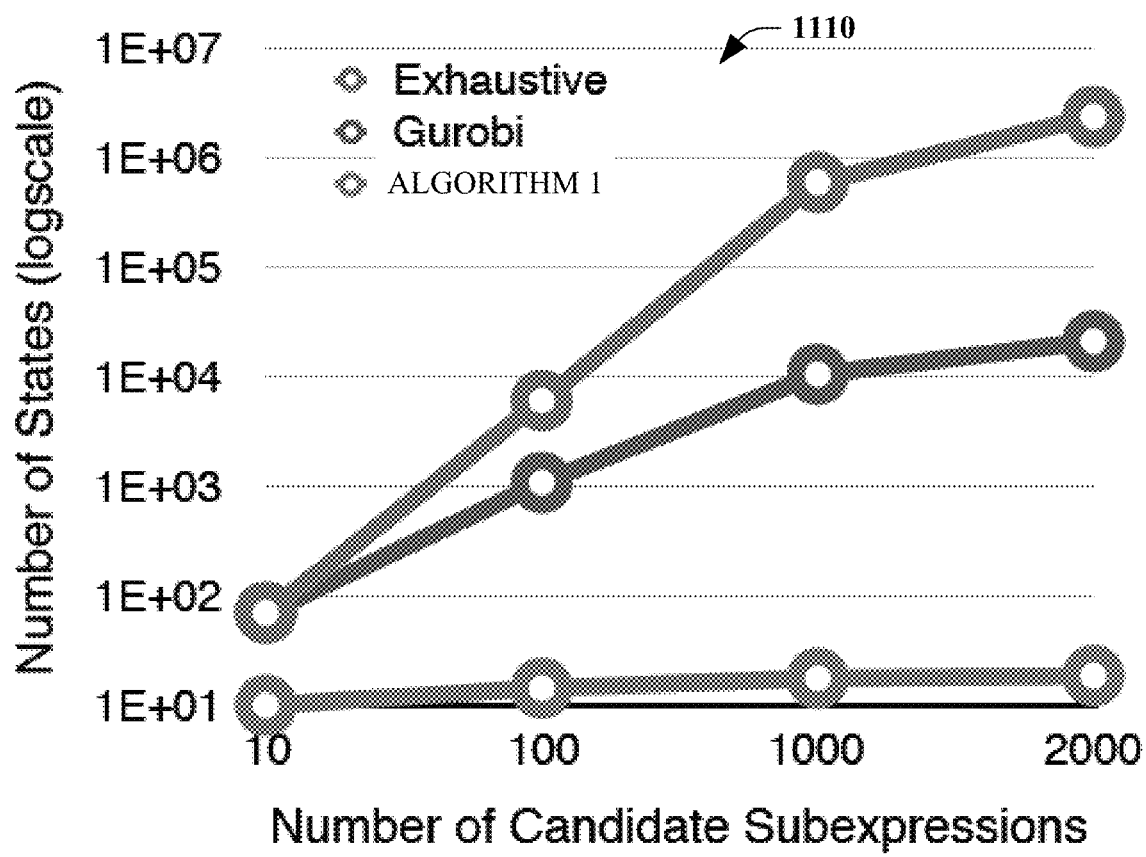
FIG. 11A is a graph illustrating a comparison of a number of candidate subexpressions vs. a number of states for algorithm 1 and an optimal algorithm.
Figure 11B:
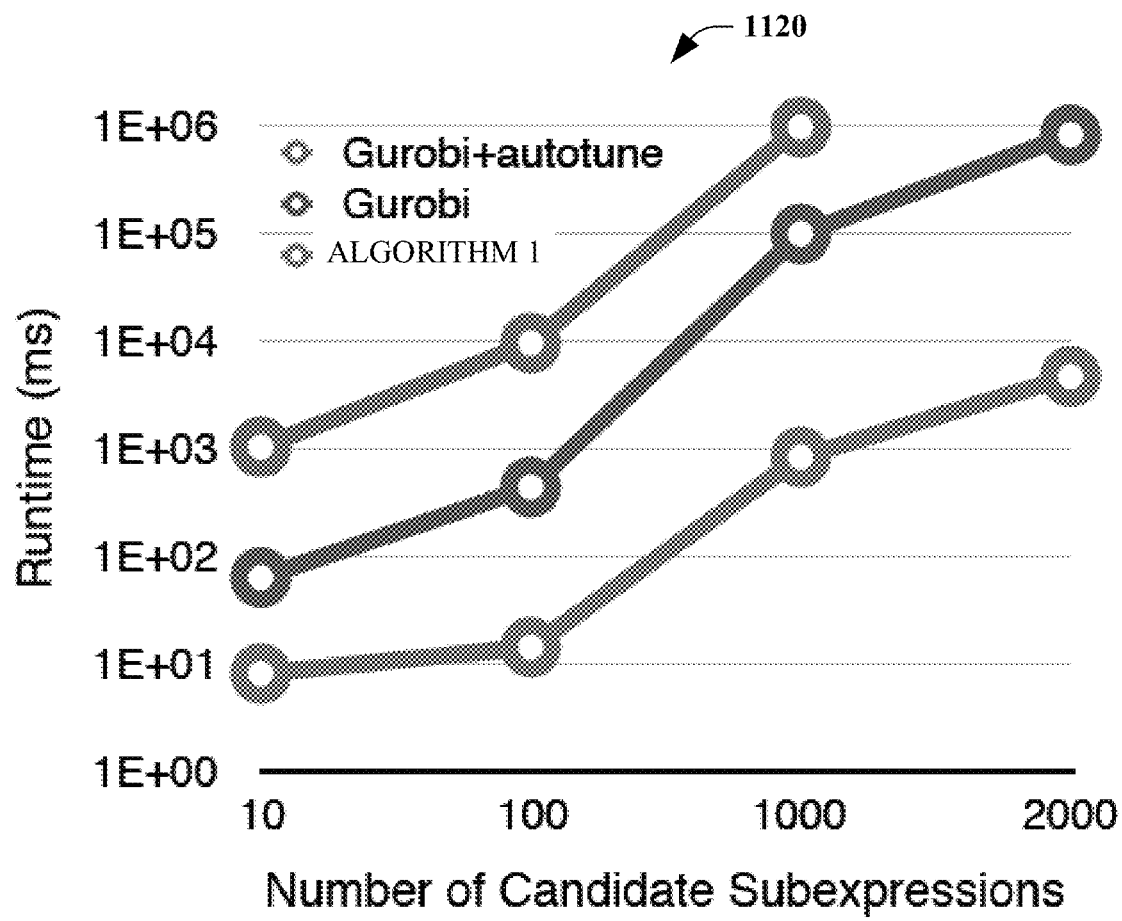
FIG. 11B is a graph illustrating a comparison of a number of candidate subexpressions vs. runtime (in milliseconds) for algorithm 1 and an optimal algorithm.
Figure 11C:
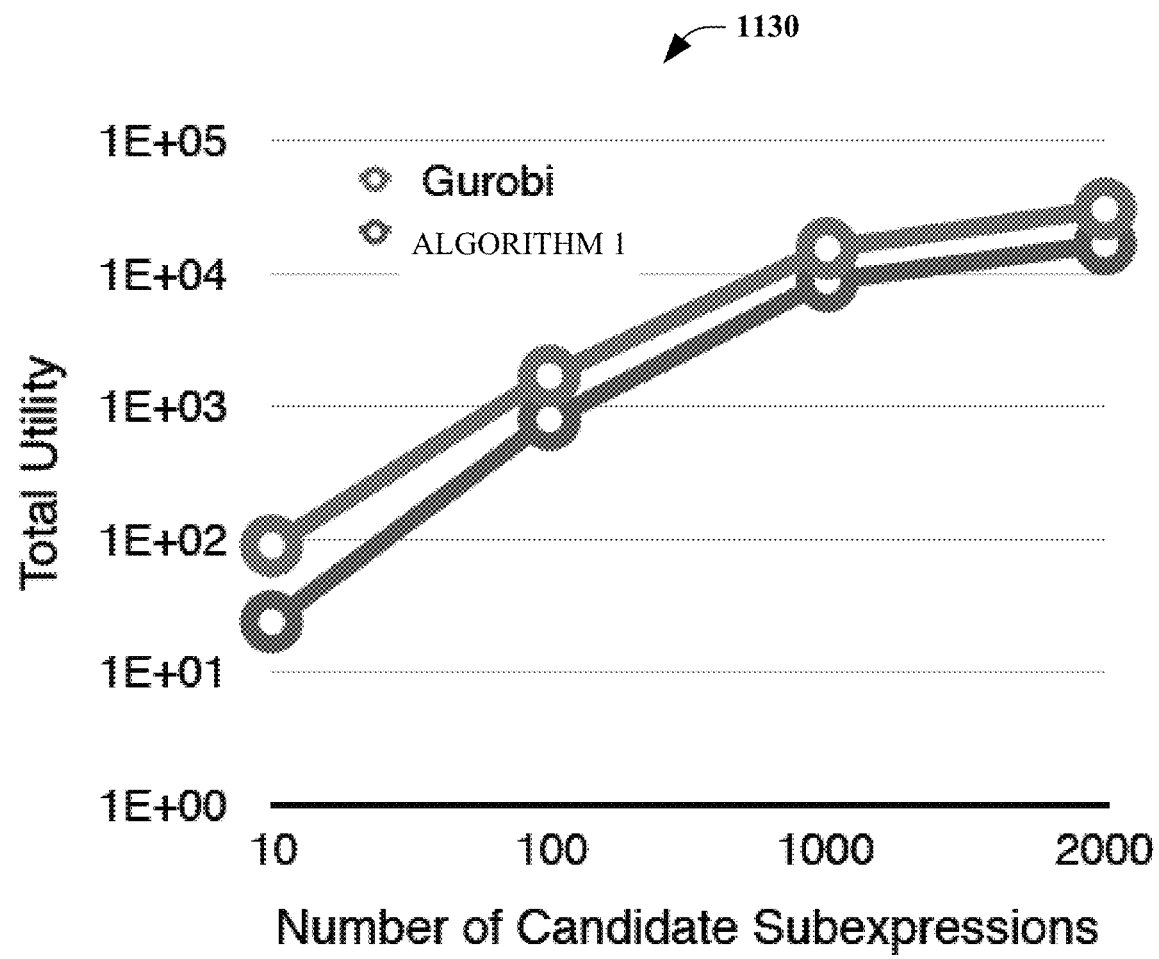
FIG. 11C is a graph illustrating a comparison of a number of candidate subexpressions vs. total utility for algorithm 1 and an optimal algorithm.
Figure 11D:
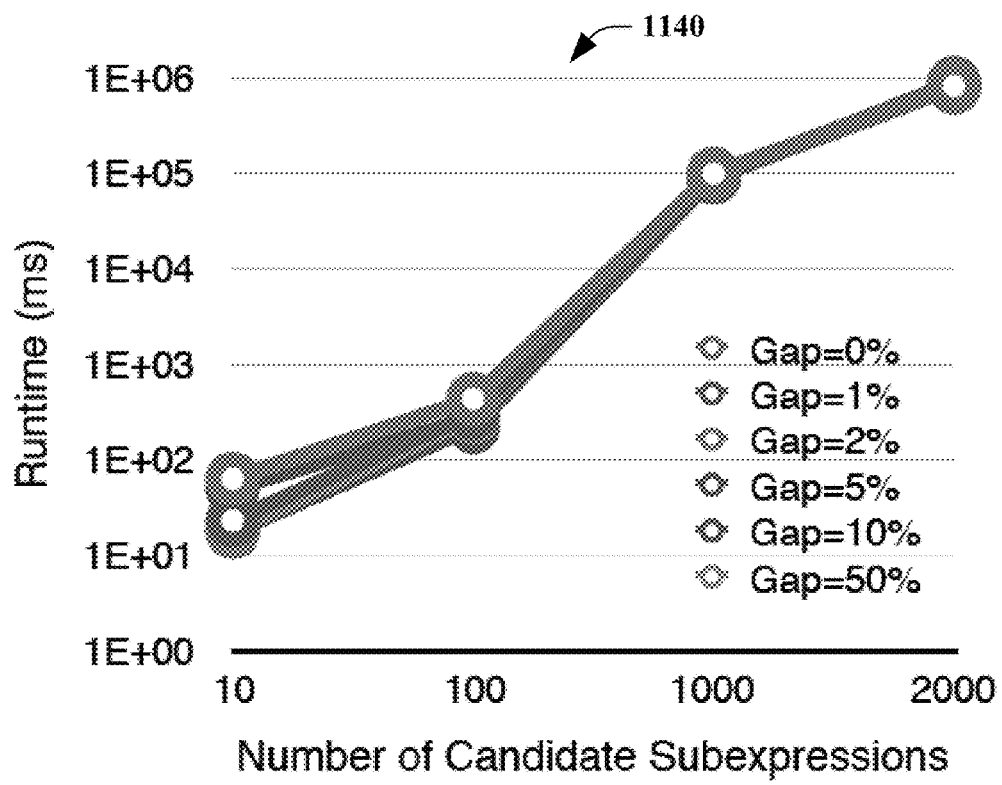
FIG. 11D is a graph illustrating a comparison of a number of candidate subexpressions vs. runtime (in milliseconds) for algorithm 1 and a relaxed optimal algorithm.
Figure 12:
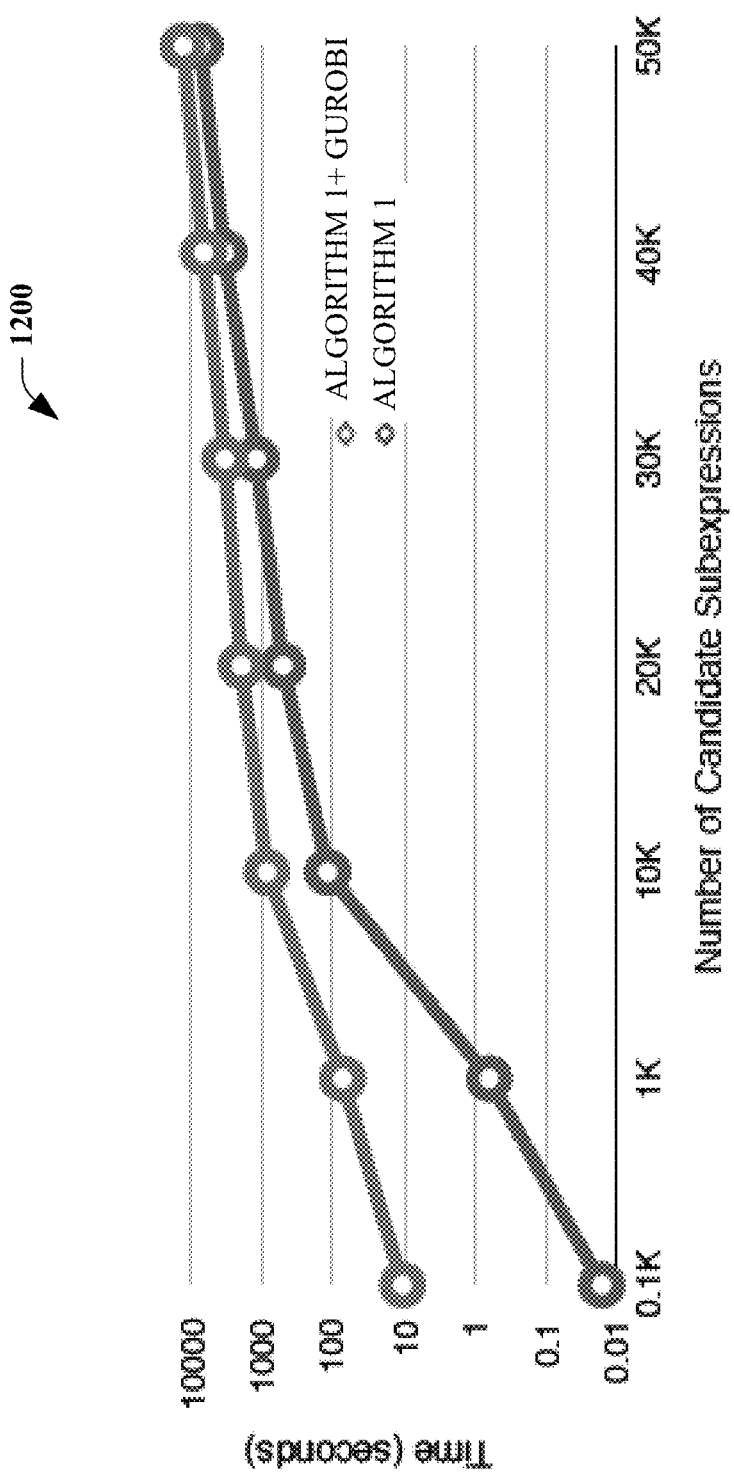
FIG. 12 is a graph illustrating exemplary results of a number of candidate subexpressions vs. time for algorithm 1 and algorithm 1+Gurobi on a single machine.

In contrast to an implementation of the global ILP formulation using a state-of-the-art commercial optimizer, which cannot support more than 2K subexpressions on a desktop machine (FIG. 11), the approach described herein scales up to 50K subexpressions even on a single machine (FIG. 12).

Figure 13A:
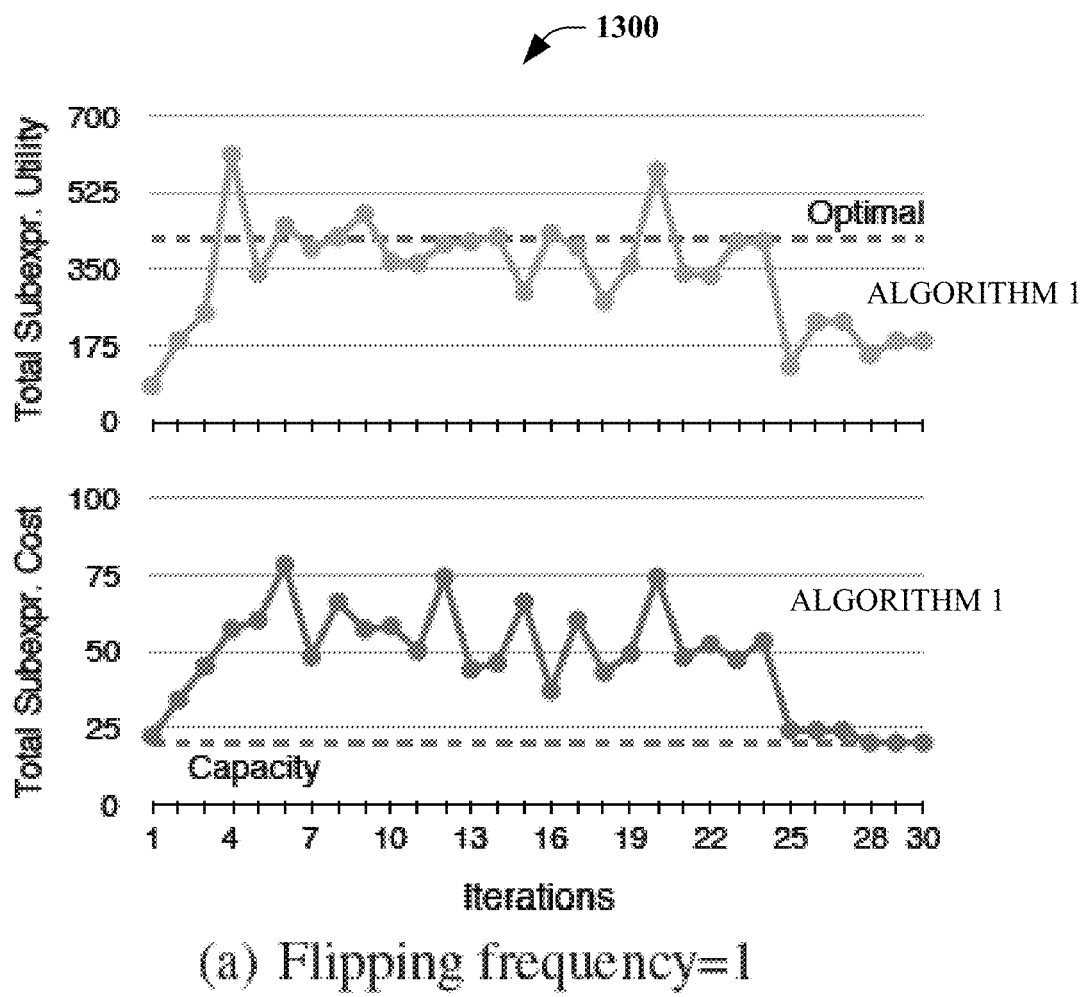
FIG. 13A is a graph illustrating exemplary convergence of algorithm 1 and an optimal algorithm.
Figure 13B:
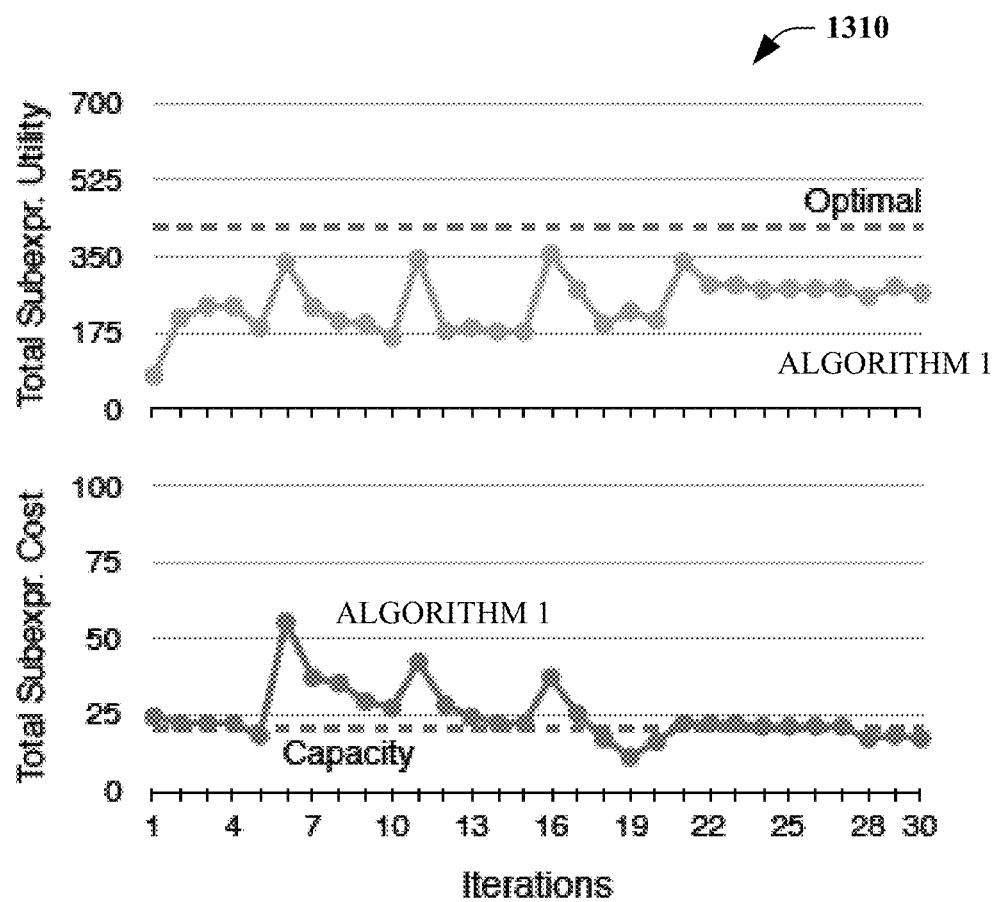
FIG. 13B is another graph illustrating exemplary convergence of algorithm 1 and an optimal algorithm.
Figure 13C:
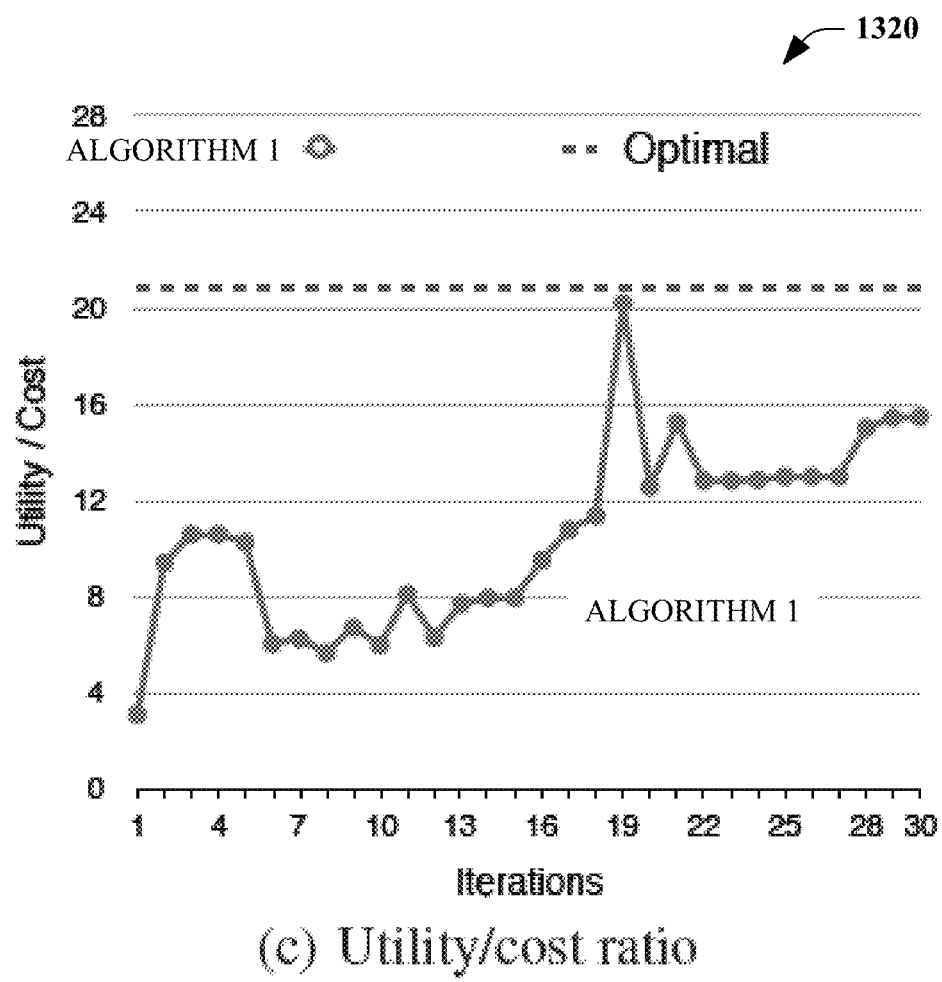
FIG. 13C is a graph illustrating an exemplary utility/cost ratio.
Figure 14:
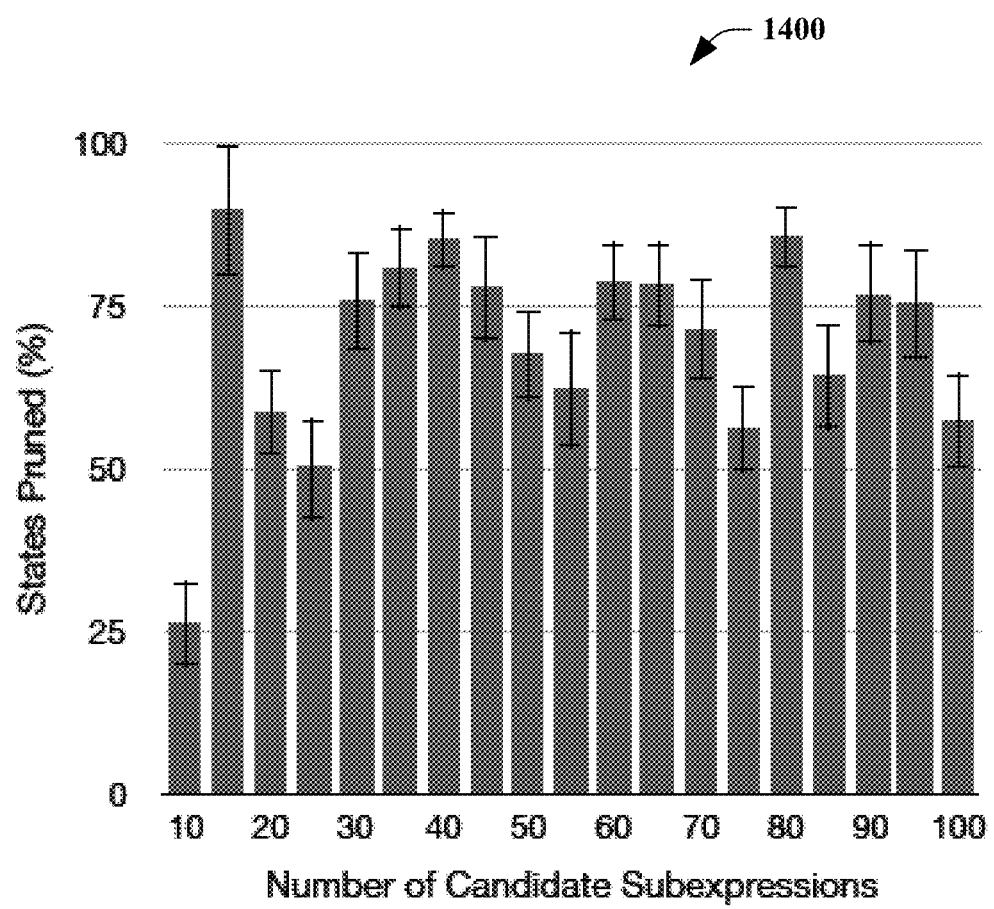
FIG. 14 is a graph illustrating an exemplary reduction in states achieved by branch-and-bound enumeration compared to a non-optimized version.
Figure 15:
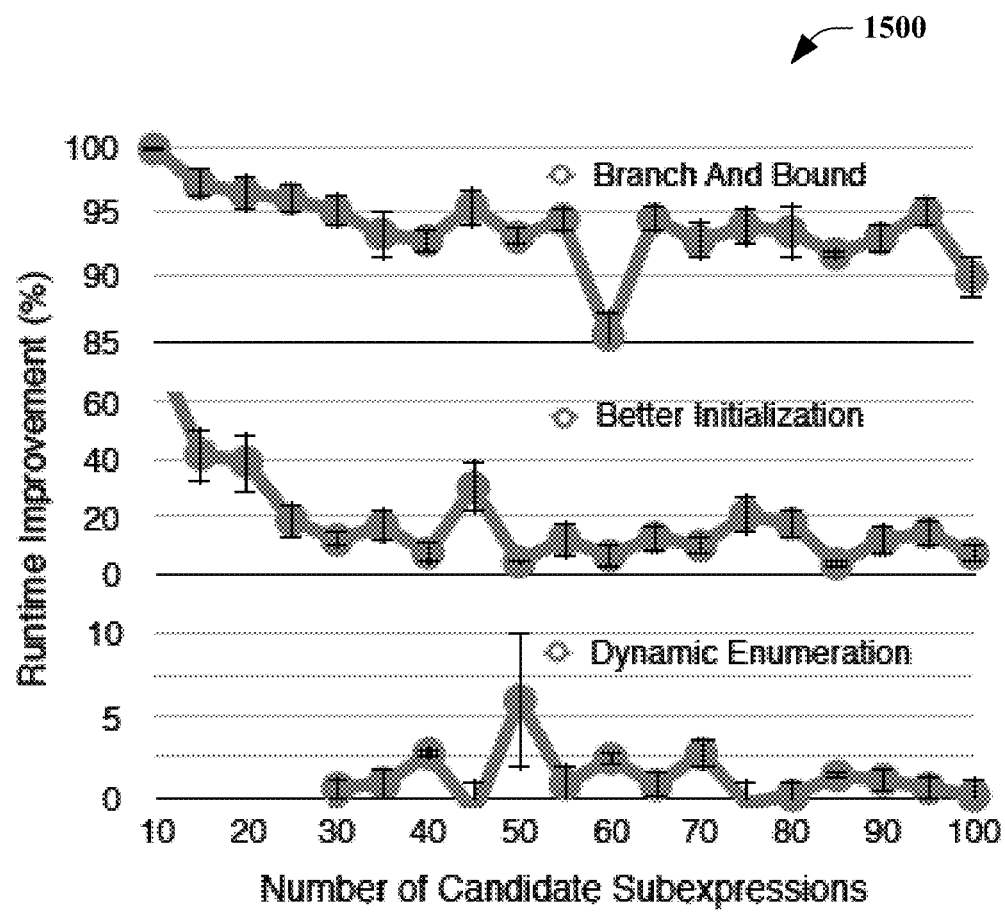
FIG. 15 is a graph illustrating an exemplary improvement in runtime by enabling pruning techniques.
Figure 16:
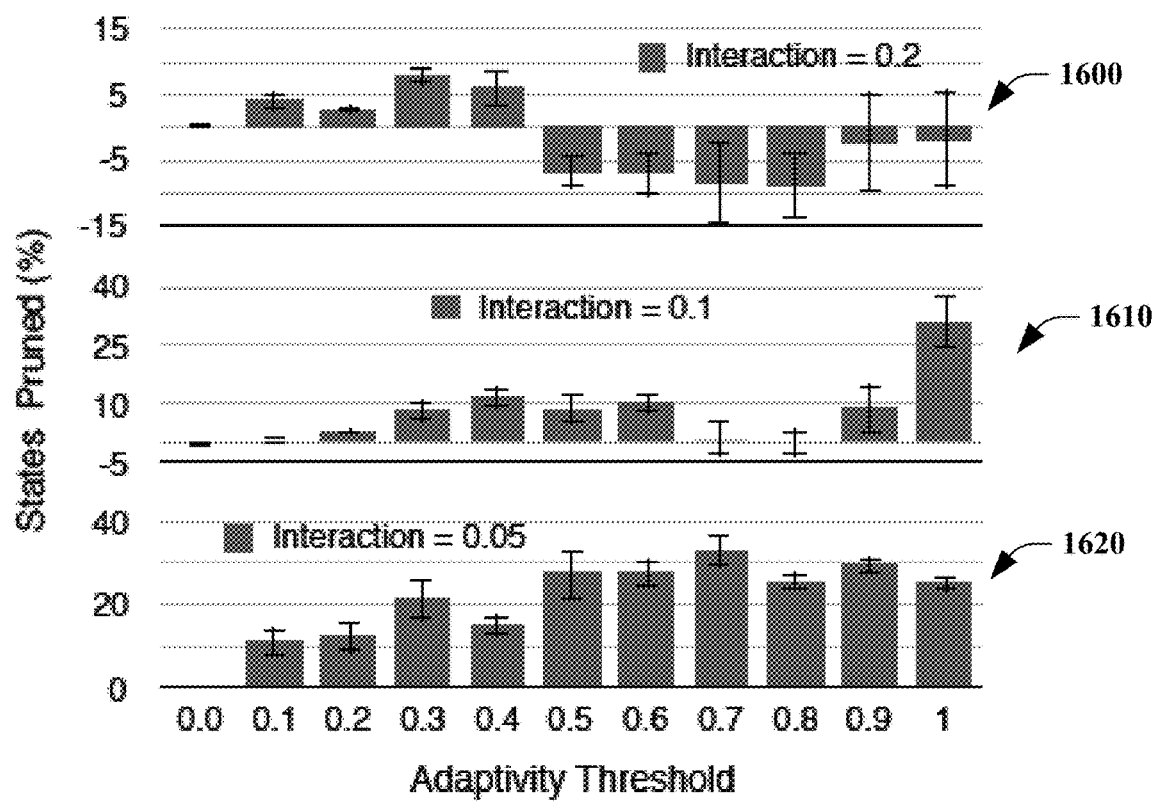
FIG. 16 is a chart illustrating exemplary additional pruning yielded by adaptive enumeration.

Algorithm 1 converges to a solution that respects the space budget (FIGS. 13A-C), while the pruning optimizations described herein can effectively reduce the search space by more than 90% in most cases (FIGS. 14-16).

Impact on Production Workloads

To study the impact of the approach described herein on real use cases, algorithm 1 was used to select subexpressions for materialization in a production clusters. The goal was to: (i) be able to perform subexpression selection over large production workloads, and (ii) select subexpressions that bring higher utility than existing subexpression selection heuristics. Below the workloads and tuning of algorithm 1 are described and then the results are presented.

Setup

Workloads

In the analytics clusters, a job repository is maintained that stores various metadata and statistics about all SCOPE jobs that get executed. This metadata is collected at different levels of granularity, including cluster, business unit, job, operator, and task levels. For the purposes of the experiments described herein, the job repository was used to extract the following sets of workloads for one day's worth of SCOPE jobs (a detailed description of the workloads is in Table 1):

TABLE 1

| | | Workload | |
|---|---|---|---|
| | | Workload1 | Workload2 |
| Production SCOPE Workloads | Overlapping Users | 9 | 748 |
| | Overlapping Jobs | 4,315 | 42,182 |
| | Total Subexpr. | 293,467 | 1,812,854 |
| | Unique Subexpr. | 63,315 | 446,954 |
| | Unique Subexpr. Size | 19.6 PB | 26.7 PB |
| Subexpression Selection Algorithm | Compute Nodes | 500 | 500 |
| | Iterations | 10 | 10 |
| | Storage Cap | 1 PB | 1 PB |
| | Runtime | ~1 hr. | ~3 hrs. |
| | Selected Subexpr. | 62% | 44% |
| | Impacted Jobs | 90% | 79% |
| | Impacted Users | 100% | 94% |
| | Machine-time Savings | 10.4% | 42.3% |

Workload1 includes all jobs of a business unit for that day. It contains 4.3K overlapping jobs and 63 K unique subexpressions.

Workload2 includes all jobs in one of the clusters for the same day. It contains 42K overlapping jobs (more than hundreds of thousands of total jobs) and 447 K unique subexpressions.

Candidate Subexpression Enumeration

For each job, a logical query tree of the job is traversed, as it is output by the SCOPE optimizer, and all its subtrees are emitted as candidate subexpressions. Subexpressions that appear only once are filtered out, since they do not present any computation reuse opportunity.

Subexpression Utility

The utility of a subexpression is computed based on Eq. 2. Instead of relying on the optimizer's cost estimates, which can be significantly inaccurate (e.g., due to missing or inaccurate statistics, user-defined functions (UDFs), error propagation, etc.), the observed machine-hours that are stored in the job repository during the previous execution of the job are relied upon. Whenever such statistics are not available, the optimizer's estimates are utilized.

Subexpression Interactions

Two subexpressions are interacting if the logical tree of the one is a subtree of the other, as noted previously. Interactions are detected during subexpression enumeration and are stored in the interaction matrix X.

Subexpression Costs

Similar to subexpression utility, the statistics stored in the job repository to collect accurate values for the cost (i.e., the storage footprint) of a subexpression are used.

Evaluation Methodology

In evaluating algorithm 1, note that it is not feasible to run the production workloads multiple times over the same data. Therefore, to quantify the machine-hour savings when a set of subexpressions is used to evaluate a query, the utilities of these subexpressions for the given query are summed, using information from the job repository and Eq. 2, as described above.

Support for Large Production Workloads

Table 1 shows the results of running the distributed SCOPE implementation of the subexpression selection algorithm (Listing 1) over the two production workloads. For materializing subexpressions, a maximum storage capacity of 1 PB was budgeted while the total data processed by the jobs is in the orders of EB (exabytes).

Despite using only a fraction of total capacity, 62% and 44% of the subexpressions were able to be materialized for Workload1 and Workload2, respectively. These subexpressions are in turn able to impact 79-90% of the jobs and 90-100% of the users. Algorithm 1 runs in less than an hour for Workload1 and close to three hours for Workload2. These execution times are reasonable given that the subexpression selection is an offline process that is executed every few days or even weeks.

Most importantly, the subexpression selection algorithm yields machine-hour savings of 10.4% and 42.3% for the two workloads, respectively. Such improvements translate to millions of dollars' worth of operational costs being saved in production clusters. Interestingly, the improvement when considering the jobs of the whole cluster is significantly higher compared to considering only a single business unit. This validates the observation 1 that the shared nature of production clusters leads to significant redundant computations across users, which generally have no way of identifying such overlaps. It also highlights the importance of an algorithm that can support workloads that span the whole cluster's load.

Comparison with Heuristics-Based Approaches

A number of heuristics have been proposed in prior works for picking interesting subexpressions (e.g., selecting subexpressions by looking at their total runtime to size ratio). To examine the quality of algorithm 1 compared to such approaches in terms of total utility (measured in machine-hours) achieved, consider the following top-k heuristics:

(1) Topk-freq. Rank subexpressions by the number of times they appear in different queries.
(2) Topk-utility. Compute the utility of each subexpression for each query, and rank subexpressions by their maximum utility for a single query.
(3) Topk-totalUtility. Similar to Topk-utility, but computed for each subexpression the sum of utilities it achieves for all queries.
(4) Topk-normTotalUtility. Rank subexpressions by their total utility divided by their storage footprint in bytes.

Figure 10:
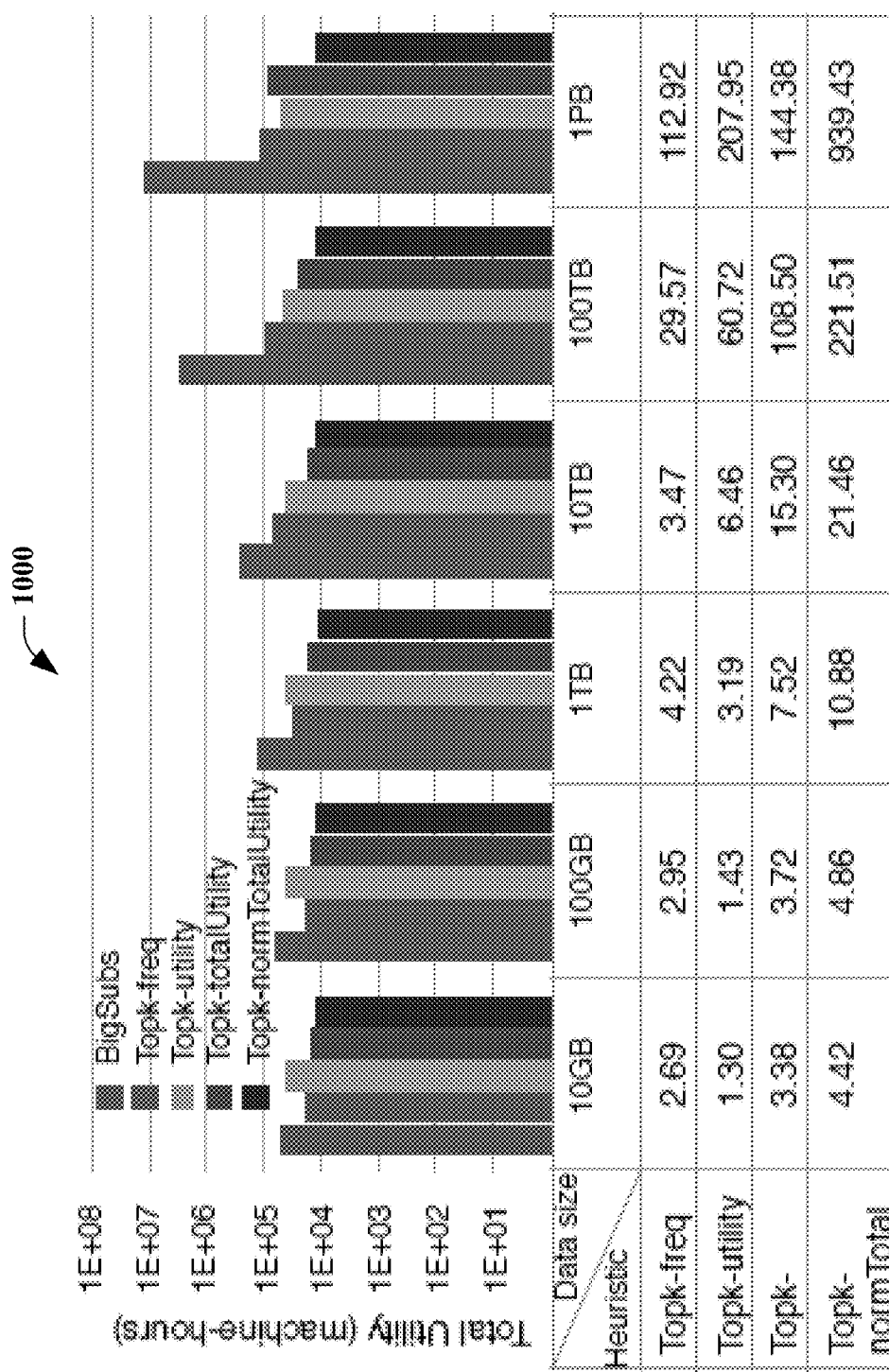
FIG. 10 is a diagram illustrating a comparison of utility of algorithm 1 vs. heuristics on an exemplary workload.

For each of these heuristics, subexpressions were selected in their ranked order until the storage budget was exceeded. FIG. 10 is a diagram 1000 that shows the total utility (machine-hours) of algorithm 1 compared to the heuristics on Workload1 with varying storage budget (i.e., for different cost-benefit trade-offs). From left to right, the bar graphs denotes algorithm 1, Topk-Freq, Topk-Utility, Topk-TotalUtility and Topk-normTotalUtility. In general, by taking a global view of the workload and the subexpression intereactions, algorithm 1 performs uniformly better across the range of storage budgets. In particular, algorithm 1 results in 30% to 400% better utility for a 10 GB budget. The improvement increases to more than two orders of magnitude for larger storage budgets with a maximum of 940× over Topk-normTotalUtility for a 1 PB budget.

None of the heuristics manages to successfully capture the constraints of subexpression selection. By comparing Topk-freq with Topk-utility, a trade-off between subexpression frequency and utility is observed: leaf-level subexpressions are the most frequent but have smaller utility; larger subexpressions have higher utility but smaller frequency. For smaller budgets, it pays off to select complex subexpressions of higher utility (Topk-utility) that are often smaller in size. With sufficiently large budgets though, ranking based on frequency (Topk-freq) gives better results. On the other hand, Topk-totalUtility and Topk-normTotalUtility combine subexpression utility and frequency across queries, but, interestingly, they perform worse than the two simpler heuristics. By selecting high-utility subexpressions that appear in multiple queries, but without taking into account interactions, they also select closely related subexpressions appearing in the same queries, thereby filling the budget with highly-interacting subexpressions. Therefore, attempting to make decisions across multiple queries without accounting for interactions can be detrimental to the solution quality.

The gains with algorithm 1 are primarily because it carefully chooses which subexpressions to materialize and does so by taking a global view of the workload. There is a trade-off between the times a subexpression appears across jobs and its utility: leaf-level subexpressions are the most frequent but have the least utility; larger subexpressions have higher utility but smaller frequency. Unlike algorithm 1, the heuristics fail to capture this trade-off.

Detailed Analysis

To better understand the behavior of algorithm 1 and to fairly compare with the ILP formulation discussed previously (hereinafter termed "Optimal") that is not parallelizable, a version of algorithm 1 was implemented in C# that runs the same iterative Algorithm 1 in a single machine. This version was to drive a set of micro-experiments and study algorithm 1's scalability and convergence, as well as the effectiveness of the pruning optimizations.

For the purposes of these experiments, a synthetic workload generator was built whose parameters and their default values are summarized in Table 2. Given the desired number of subexpressions (NumberOfSubexpr), the generator determines the number of queries using the SubexprToJobRatio. It randomly sets the cost of each subexpression to a value from 1 to 10. Then it generates the utility matrix U by setting each element $u_{ij}$ to a random value from 1 to 10 with probability RelevantPerJob=# jobs; otherwise the entry is 0. Moreover, it generates the subexpression interaction matrix X by setting each element $x_{ij}$ to 1 with probability InteractionProb. Note that the generator purposely does not specify the direction of interaction between two subexpressions (i.e., containment), as this is not required in the formulation of above. For interacting subexpressions $s_1$ and $s_2$, the workload is valid both when the utility of $s_1$ is higher than that of $s_2$ ($s_1$ contains $s_2$) and when it is lower ($s_1$ is contained in $s_2$).

TABLE 2

| Parameter | Meaning | Default |
| --- | --- | --- |
| NumberOfSubexpr | Number of candidate subexpr. | 25 |
| SubexprToJobRatio | Average number of candidate subexpr. per job | 0.6 |
| SubexprToCapRatio | Cost constraint as a proportion of #subexpr. | 0.8 |
| RelevantPerJob | Number of possible subexpr. rewrites per job | 10 |
| InteractionProb | Chance of interaction between two subexpr. | 0.2 |
| Iterations | #iterations in bipartite graph labeling | 20 |
| InitZjProb | Probability to initialize subexpr. vertices to 1 | 0 |
| AdaptiveThreshold | Switch point between bottom-up and top-down | 0.2 |
| StricterFlipping | % of iterations before stricter flipping | 80% |

In this experiment, a desktop machine running Windows® 10 Enterprise Edition, having 32 GB of memory and two 2.4 GHz processors with a total of 12 cores and 24 hardware threads was used. The average of three runs for all experiments is reported.

Comparison with Optimal

To compare with the OPTIMAL, the global ILP formulation was implemented using Gurobi (version 7.5.2), one of the most widely-used commercial optimizers. FIGS. 11A-11D report the findings for workloads of up to 2000 subexpressions. Beyond that size, Gurobi ran out of memory on a desktop with 32 GB of memory.

FIG. 11A is a graph 1110 that illustrates the number of possible solutions (states) considered by Algorithm 1 and Gurobi, as well as the states that an exhaustive approach would consider (computed by the formula $2^{mn}$). Gurobi performs a pre-solve phase that prunes a large number of states, when compared to exhaustive. However, given that it solves a global ILP problem, it considers up to three orders of magnitude more states than Algorithm 1. On the other hand, Algorithm 1, solving smaller ILP problems and applying domain-specific optimizations, avoids overloading the search space. Similarly, FIG. 11B is a graph 1120 that shows that the actual runtime of Gurobi is two orders of magnitude longer than that of Algorithm 1. For example, for 2000 subexpressions, Gurobi takes 14 minutes, while Algorithm 1 takes just 4.7 seconds. Gurobi's utility that automatically tunes the parameter values for a given input ("Gurobi+ autotune") was also experimented with, but the resulting end-to-end time of parameter tuning and optimization ended up being even longer. Note, however, that the utility of Gurobi's output as illustrated in graph 1130 of FIG. 11C is, as expected, higher than Algorithm 1 (by up to 2x), so for small input sizes (up to 2000 subexpressions, which is not practical in datacenter scale setting), Gurobi could be used instead.

Finally, an attempt was made relaxing Gurobi's optimality, by increasing the optimality "gap tolerance" from 0% (optimal) to 50%, which allows the solver to terminate before it reaches the optimal solution. As illustrated in graph 1140 of FIG. 11D, this did not significantly improve Gurobi's runtimes for the problem, although it was observed that it did compromise the achieved total utility.

Scalability

To assess scalability of Algorithm 1, in FIG. 12 a graph 1200 is illustrated that reports runtime of Algorithm 1 and for workloads with an increasing number of subexpressions. For the largest workload that tried (with 50,000 subexpressions), algorithm 1 is tractable with 128 minutes of runtime on a single desktop machine.

As an alternative approach, Gurobi was used to solve the local ILP problems at each of the job vertices, instead of our branch-and-bound algorithm. Interestingly, as the top line of FIG. 12 shows, this variant ("Algorithm 1+Gurobi") comes quite close to standard Algorithm 1 for large workloads. However, it is still 75% slower than standard Algorithm 1 for 50,000 subexpressions, which shows the importance of local optimizations, as discussed below. Observe that this variant returns solutions of the same total utility as Algorithm 1, as they both find the optimal solution to each local ILP.

Convergence

Recall that algorithm 1 is expected to converge to a solution within the cost (capacity) bound. To evaluate its convergence, a workload with 25 subexpressions and the default parameters of Table 2 was used. As described above, stricter flipping is applied in the last 20% of the iterations, which was empirically chosen as the default setting. FIG. 13A is a graph 1300 illustrating that the total cost converges to the cost budget and, correspondingly, the total utility reaches a fixed value (the "Optimal" line is computed by solving the global ILP with Gurobi). To further observe the impact of stricter flipping, a variance of algorithm 1 in which a stricter flipping is applied with the exception of one in every five iterations. In some embodiments, a frequency of five was used as this yield best results in practice. FIG. 13B is a graph 1310 illustrating the utility and cost achieved. In this case, the total cost remains closer to the cost budget, since stricter flipping avoids changing vertex labels as often. The total cost remains closer to the cost budget and the achieved total utility is higher. For the frequency of five, FIG. 13C is a graph 1320 which depicts the ratio of utility with cost, indicating that algorithm 1 finds a better utility per cost unit as the number of iterations increases. Note that higher frequencies do not lead to a better utility, since the exploration tends to get stuck to local optima.

Pruning Effectiveness

Finally, the effectiveness of the pruning optimizations discussed above are assessed in reducing the number of states explored by the plain (non-optimized) version of algorithm 1.

FIG. 14 is a graph 1400 illustrating the reduction in states achieved by the branch-and-bound enumeration compared to the non-optimized version by detecting interactions between subexpressions fast. Although the achieved reduction varies depending on the exact workload that was generated each time, the reduction in states is always significant, ranging from 26% to 90% of the states. For each workload, the average and standard error (error bars) are reported over five runs. Some variation across runs for the same workload is to be expected given the probabilistic nature of the approach.

Branch-and-bound detects interactions between subexpressions fast, resulting in significant pruning ranging from 33% to 92% of the states. FIG. 15 is a graph 1500 illustrating the actual improvement in runtime by successively enabling the pruning techniques described above. Branch-and-bound reduces the runtime by over 90%, better initialization further reduces the runtime by up to 15%, and dynamic enumeration achieves an additional reduction of up to 10%. Observe that dynamic enumeration's improvement might be slightly negative, when it mistakenly picks top-down enumeration, although the default bottom-up was the better choice. In practice only a few of such cases were observed. In some embodiments, similar pruning effectiveness was observed while varying other parameters in the workload generator, e.g., number of subexpressions per job, subexpression interaction probability, cost budget, initialization probability.

FIG. 16 includes charts 1600, 1610, 1620 which show the additional pruning yielded by adaptive enumeration, i.e., by dynamically picking the enumeration direction at each branching point of Algorithm 2, based on a threshold. top-down (bottom-up) enumeration is picked when algorithm 2 is below (above) a threshold. The charts in FIG. 16 show results for varying adaptivity thresholds and subexpression interaction probabilities. Adaptive enumeration is more effective for less interacting workloads, with a state reduction of up to 32%. In these cases, higher thresholds that avoid changing direction too often tend to work better. For more interacting workloads, as discussed in above, the default bottom-up enumeration is expected to work better, and thus adaptive enumeration is less effective and should be avoided or used after careful tuning.

Figure 17A:
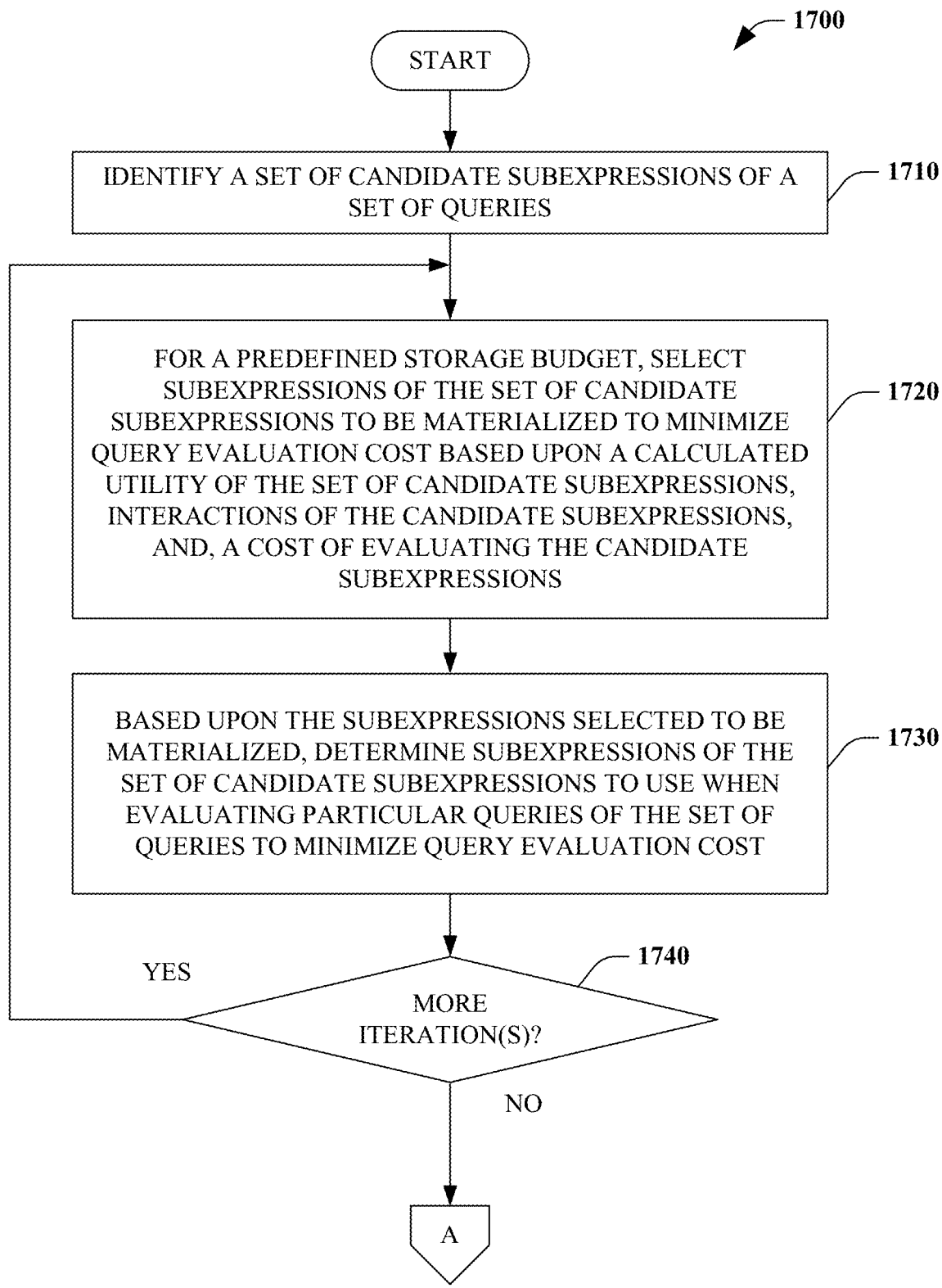
FIGS. 17A and 17B illustrate an exemplary method of selecting subexpressions to be materialized for a datacenter.
Figure 17B:
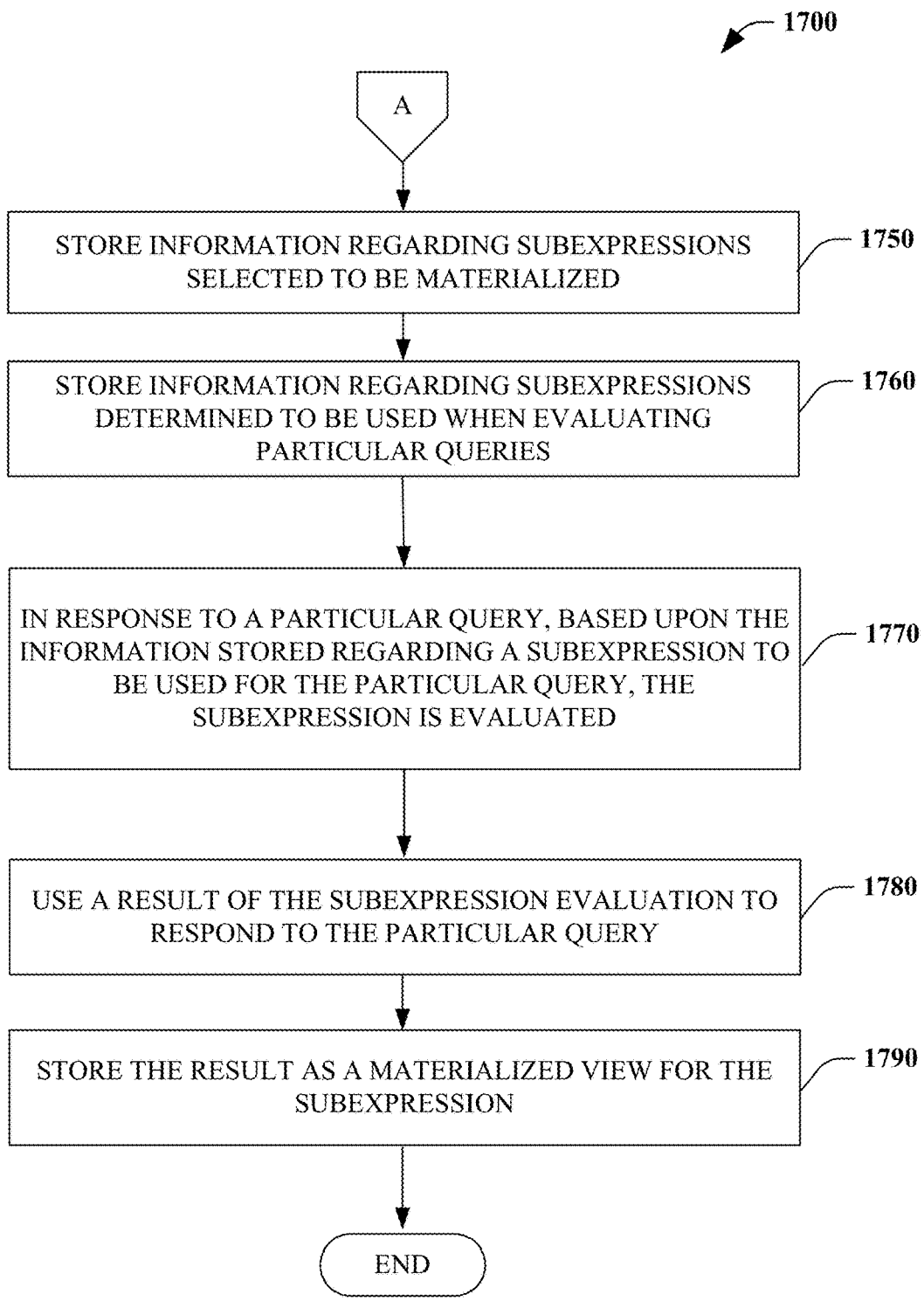

FIGS. 17A and 17B illustrate an exemplary methodology of selecting subexpressions to be materialized for a datacenter. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIGS. 17A and 17B, a method of selecting subexpressions to be materialized for a datacenter 1700 is illustrated. In some embodiments, the method 1700 is performed by the system 100. At 1710, a set of candidate subexpressions of a set of queries is identified.

At 1720, for a predefined storage budget, subexpressions of a set of candidate subexpressions to be materialized (e.g., to minimize query evaluation cost) are selected based upon a calculated utility of the set of candidate subexpressions, interactions of the candidate subexpressions, and, a cost of evaluating the candidate subexpressions. At 1730, based upon the subexpressions selected to be materialized, subexpressions of the set of candidate subexpressions to be used when evaluating particular queries of the set of queries are determined (e.g., to minimize query evaluation cost).

At 1740, a determination is made as to whether more iteration(s) are indicated. If the determination at 1740 is YES, processing continues at 1720. If the determination at 1740 is NO, at 1750, information regarding subexpressions selected to be materialized is stored. At 1760, information regarding subexpressions determined to be used when evaluating particular queries is stored.

At 1770, in response to a particular query, based upon the information stored regarding a subexpression to be used for the particular query, the subexpression is evaluated. At 1780, a result of the subexpression evaluation is used to respond to the particular query. At 1790, the result is stored as a materialized view for the subexpression.

Figure 18:
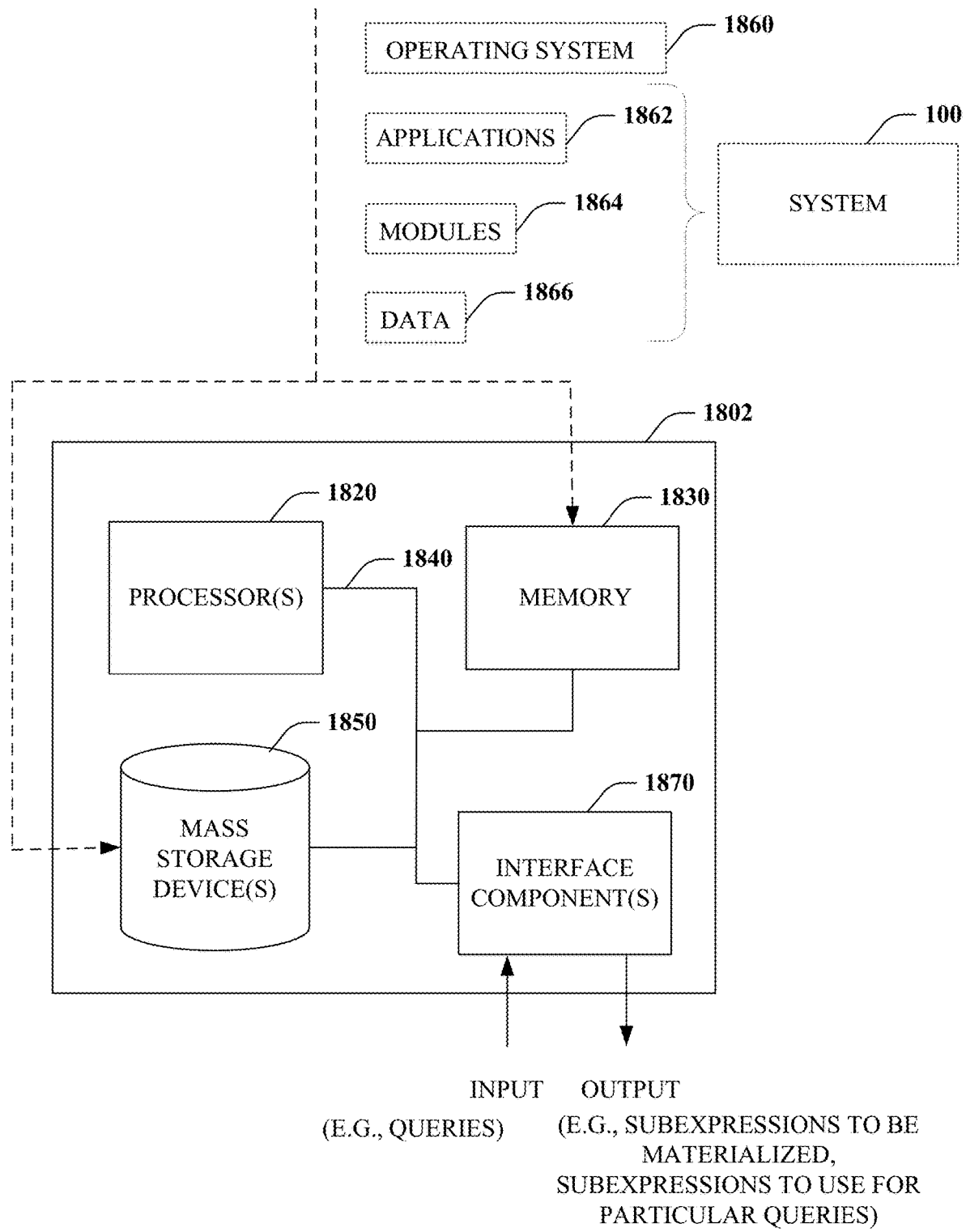
FIG. 18 is a functional block diagram that illustrates an exemplary computing system.

With reference to FIG. 18, illustrated is an example general-purpose computer or computing device 1802 (e.g., mobile phone, desktop, laptop, tablet, watch, server, handheld, programmable consumer or industrial electronics, set-top box, game system, compute node, etc.). For instance, the computing device 1802 may be used in a system for estimating material(s) for selecting subexpressions to be materialized for a datacenter 100.

The computer 1802 includes one or more processor(s) 1820, memory 1830, system bus 1840, mass storage device(s) 1850, and one or more interface components 1870. The system bus 1840 communicatively couples at least the above system constituents. However, it is to be appreciated that in its simplest form the computer 1802 can include one or more processors 1820 coupled to memory 1830 that execute various computer executable actions, instructions, and or components stored in memory 1830. The instructions may be, for instance, instructions for implementing functionality described as being carried out by one or more components discussed above or instructions for implementing one or more of the methods described above.

The processor(s) 1820 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1820 may also be implemented as a combination of computing devices, for example a combination of a DSP and a microprocessor, a plurality of microprocessors, multi-core processors, one or more microprocessors in conjunction with a DSP core, or any other such configuration. In some embodiments, the processor(s) 1820 can be a graphics processor.

The computer 1802 can include or otherwise interact with a variety of computer-readable media to facilitate control of the computer 1802 to implement one or more aspects of the claimed subject matter. The computer-readable media can be any available media that can be accessed by the computer 1802 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 1802. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1830 and mass storage device(s) 1850 are examples of computer-readable storage media. Depending on the exact configuration and type of computing device, memory 1830 may be volatile (e.g., RAM), non-volatile (e.g., ROM, flash memory, etc.) or some combination of the two. By way of example, the basic input/output system (BIOS), including basic routines to transfer information between elements within the computer 1802, such as during start-up, can be stored in nonvolatile memory, while volatile memory can act as external cache memory to facilitate processing by the processor(s) 1820, among other things.

Mass storage device(s) 1850 includes removable/non-removable, volatile/non-volatile computer storage media for storage of large amounts of data relative to the memory 1830. For example, mass storage device(s) 1850 includes, but is not limited to, one or more devices such as a magnetic or optical disk drive, floppy disk drive, flash memory, solid-state drive, or memory stick.

Memory 1830 and mass storage device(s) 1850 can include, or have stored therein, operating system 1860, one or more applications 1862, one or more program modules 1864, and data 1866. The operating system 1860 acts to control and allocate resources of the computer 1802. Applications 1862 include one or both of system and application software and can exploit management of resources by the operating system 1860 through program modules 1864 and data 1866 stored in memory 1830 and/or mass storage device (s) 1850 to perform one or more actions. Accordingly, applications 1862 can turn a general-purpose computer 1802 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 1862, and include one or more modules 1864 and data 1866 stored in memory and/or mass storage device(s) 1850 whose functionality can be realized when executed by one or more processor(s) 1820.

In accordance with one particular embodiment, the processor(s) 1820 can correspond to a system on a chip (SOC) or like architecture including, or in other words integrating, both hardware and software on a single integrated circuit substrate. Here, the processor(s) 1820 can include one or more processors as well as memory at least similar to processor(s) 1820 and memory 1830, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 1802 also includes one or more interface components 1870 that are communicatively coupled to the system bus 1840 and facilitate interaction with the computer 1802. By way of example, the interface component 1870 can be a port (e.g., serial, parallel, PCMCIA, USB, FireWire, etc.) or an interface card (e.g., sound, video, etc.) or the like. In one example implementation, the interface component 1870 can be embodied as a user input/output interface to enable a user to enter commands and information into the computer 1802, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 1870 can be embodied as an output peripheral interface to supply output to displays (e.g., LCD, LED, plasma, etc.), speakers, printers, and/or other computers, among other things. Still further yet, the interface component 1870 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
a computer comprising a processor and a memory having computer-executable instructions stored thereupon which, when executed by the processor, cause the computer to:
subject to a predefined storage budget, identify at least two different candidate sets of candidate subexpressions as candidates for materialization when executing a set of queries;
select, from the at least two different candidate sets of candidate subexpressions, a particular set of subexpressions to materialize based at least upon calculated utilities of individual candidate subexpressions, interactions of the individual candidate subexpressions in each candidate set, and a respective costs of evaluating the individual candidate subexpressions; and
select particular subexpressions of the particular set of subexpressions to use when evaluating particular queries of the set of queries.

2. The system of claim 1, the memory having further computer-executable instructions stored thereupon which, when executed by the processor, cause the computer to:
identify the at least two different candidate sets of candidate subexpressions from the set of queries.

3. The system of claim 1, the memory having further computer-executable instructions stored thereupon which, when executed by the processor, cause the computer to:
perform a plurality of iterations of selecting the particular set of subexpressions to materialize and selecting the particular subexpressions to use when evaluating the particular queries.

4. The system of claim 3, wherein the plurality of iterations is a predefined number of iterations.

5. The system of claim 1, the memory having further computer-executable instructions stored thereupon which, when executed by the processor, cause the computer to:

responsive to a first query, evaluate a first subexpression of the particular set of subexpressions; and provide a response to the first query based at least upon a result of evaluating the first subexpression.

6. The system of claim 5, the memory having further computer-executable instructions stored thereupon which, when executed by the processor, cause the computer to:

responsive to evaluating the first subexpression of the particular set of subexpressions, store the result.

7. The system of claim 6, the memory having further computer-executable instructions stored thereupon which, when executed by the processor, cause the computer to:

provide a response to a second query based at least upon the stored result of the first subexpression.

8. The system of claim 1, the memory having further computer-executable instructions stored thereupon which, when executed by the processor, cause the computer to:

store information regarding the particular set of subexpressions that are selected for materialization.

9. The system of claim 1, the memory having further computer-executable instructions stored thereupon which, when executed by the processor, cause the computer to:

store information regarding the particular subexpressions to use when evaluating each particular query; and provide the information to a query optimizer.

10. The system of claim 1, the memory having further computer-executable instructions stored thereupon which, when executed by the processor, cause the computer to:

evaluate each of the particular subexpressions of the particular set and store corresponding evaluation results as materialized views.

11. A computer-implemented method, comprising:

subject to a predefined storage budget, identifying at least two different candidate sets of candidate subexpressions as candidates for materialization when executing a set of queries;

selecting, from the at least two different candidate sets of candidate subexpressions, a particular set of subexpressions to materialize based at least upon calculated utilities of individual candidate subexpressions, interactions of the individual candidate subexpressions in each candidate set, and costs of evaluating the individual candidate subexpressions; and selecting particular subexpressions of the particular set of subexpressions to use when evaluating particular queries of the set of queries.

12. The computer-implemented method of claim 11, further comprising:

identifying the at least two different candidate sets of candidate subexpressions from the set of queries.

13. The computer-implemented method of claim 11, further comprising:

iteratively performing the selecting the particular set of subexpressions to materialize and the selecting the particular subexpressions to use when evaluating the particular queries until a predefined number of iterations has been performed.

14. The computer-implemented method of claim 11, further comprising:

responsive to a first query, evaluating a first subexpression of the particular set of subexpressions; and providing a response to the first query based at least upon a result of evaluating the first subexpression.

15. The computer-implemented method of claim 14, further comprising:

responsive to evaluating the first subexpression, storing the result.

16. The computer-implemented method of claim 15, further comprising:

responsive to a second query, providing a response to the second query based at least upon the stored result of evaluating the first subexpression.

17. The computer-implemented method of claim 11, further comprising:

storing information regarding the particular subexpressions to use when evaluating the particular queries; and providing the information to a query optimizer.

18. The computer-implemented method of claim 11, further comprising:

evaluating the particular subexpressions of the particular set and storing corresponding evaluation results as materialized views.

19. A computer storage media storing computer-readable instructions that, when executed, cause a computing device to:

identify a set of candidate subexpressions of a set of queries;

subject to a materialization storage budget, designate selected subexpressions of the set of candidate subexpressions to be materialized based at least upon utility of individual candidate subexpressions, interactions of the individual candidate subexpressions with other candidate subexpressions, and costs associated with evaluating the individual candidate subexpressions;

select particular subexpressions, from the selected subexpressions that are designated to be materialized, to use when evaluating particular queries from the set of queries;

store first information regarding the selected subexpressions that are designated to be materialized; and store second information regarding the particular subexpressions to use when evaluating the particular queries.

20. The computer storage media of claim 19, storing further computer-readable instructions that, when executed, cause the computing device to:

in response to receiving a request to execute a first query, based at least upon the stored second information, evaluate one or more of the particular subexpressions and store one or more materialized views for the one or more particular subexpressions.

* * * * *